(12) United States Patent
Sakurai et al.

(10) Patent No.: US 6,397,586 B1
(45) Date of Patent: Jun. 4, 2002

(54) EMISSION CONTROL APPARATUS AND METHOD OF INTERNAL COMBUSTION ENGINE

(75) Inventors: Kazuhiro Sakurai, Gotenba; Takashi Watanabe, Susono, both of (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/453,687

(22) Filed: Dec. 3, 1999

(30) Foreign Application Priority Data

Dec. 22, 1998 (JP) .......................... 10-364670

(51) Int. Cl.[7] .................................. F01N 3/00
(52) U.S. Cl. ......................... 60/288; 60/285; 60/291
(58) Field of Search .................... 60/274, 287, 288, 60/284, 291, 295, 297, 286, 285; 423/212

(56) References Cited

U.S. PATENT DOCUMENTS

| 5,051,244 A | * | 9/1991 | Dunne et al. ............... 423/212 |
| 5,345,762 A | * | 9/1994 | Lütze .......................... 60/288 |
| 5,355,672 A | * | 10/1994 | Adamczyk, Jr. et al. ...... 60/288 |
| 5,396,764 A | * | 3/1995 | Rao et al. ...................... 60/287 |
| 5,398,503 A | * | 3/1995 | Danno et al. ................... 60/288 |
| 5,489,319 A | * | 2/1996 | Tokuda et al. ................. 60/286 |
| 5,517,820 A | * | 5/1996 | Kuroda et al. ................. 60/288 |
| 5,522,219 A | * | 6/1996 | Orzel et al. .................... 60/288 |
| 5,582,003 A | * | 12/1996 | Patil et al. ..................... 60/284 |
| 5,613,359 A | * | 3/1997 | Zahn et al. .................... 60/288 |
| 5,693,877 A | * | 12/1997 | Ohsuga et al. ................ 60/287 |
| 5,901,553 A | * | 5/1999 | Cullen .......................... 60/287 |
| 6,003,309 A | * | 12/1999 | Agustin et al. ................ 60/288 |
| 6,012,284 A | * | 1/2000 | Tanaka et al. ................. 60/288 |
| 6,018,943 A | * | 2/2000 | Martin et al. ................. 60/287 |
| 6,089,014 A | * | 7/2000 | Day et al. ..................... 60/297 |

FOREIGN PATENT DOCUMENTS

| EP | 0430269 | * | 6/1991 |
| JP | U-62-10223 | | 1/1987 |
| JP | 62-174522 | * | 7/1987 |
| JP | A-1-257710 | | 10/1989 |
| JP | A-4-194309 | | 7/1992 |
| JP | A-6-74020 | | 3/1994 |

* cited by examiner

Primary Examiner—Thomas Denion
Assistant Examiner—Tu M. Nguyen
(74) Attorney, Agent, or Firm—Oliff & Berridge PLC

(57) ABSTRACT

An emission control apparatus for an internal combustion engine has a bypass passage bypassing a portion of a main exhaust passage located upstream of an exhaust gas-purifying catalyst device, an adsorbent provided in the bypass passage, a passage switching device for switching between flow of exhaust gas to the bypass passage and flow of exhaust gas to the main exhaust passage, and a bypass flow control device for adjusting a flow that occurs through the bypass passage when the unburned gas component is desorbed (released) from the adsorbent so that the flow through the bypass passage becomes equal to or less than a predetermined flow and assumes a proportion that is equal to or less than a predetermined proportion relative to the flow through the main exhaust passage.

38 Claims, 14 Drawing Sheets

EMISSION CONTROL APPARATUS AND METHOD OF INTERNAL COMBUSTION ENGINE

INCORPORATION BY REFERENCE

The disclosure of Japanese Patent Application No. HEI 10-364670 filed on Dec. 22, 1998 including the specification, drawings and abstract, is incorporated herein by reference in its entirety.

BACKGROUND OF THE INVENTION

1. Field of Invention

The present invention relates to an emission control apparatus and method for purifying exhaust gas emitted from an internal combustion engine.

2. Description of Related Art

Many internal combustion engines of, for example, motor vehicles, have in the exhaust system thereof a catalyst device in which precious metals, such as platinum, palladium and the like, are supported as catalysts in order to eliminate or lessen harmful exhaust gas components, for example carbon monoxide (CO), oxides of nitrogen (NOx), hydrocarbons (HC) and the like, before letting out the components into the atmosphere.

A typical catalyst device causes HC and CO present in exhaust gas to react with $O_2$ present in exhaust gas thereby oxidizing HC and CO into $H_2O$ and $CO_2$, and causes NOx present in exhaust gas to react with HC and CO present in exhaust gas thereby reducing NOx into $H_2O$, $CO_2$ and $N_2$.

At the time of start of an internal combustion engine, relatively large amounts of unburned gas components, such as unburned hydrocarbons (HC) and the like, are emitted because unstable combustion is caused by relatively low engine temperature and, at the same time, the engine air-fuel ratio is set lower than the theoretical air-fuel ratio (shifted to the fuel-rich side) in order to facilitate the starting of the engine.

The catalyst device of an internal combustion engine becomes able to significantly lessen the harmful exhaust gas components when the temperature of the device reaches or exceeds a predetermined activation temperature. Therefore, when the activation temperature has not been reached, for example, at the time of cold start of the engine, the catalyst device cannot significantly lessen unburned gas components, which are emitted in large amounts in such a situation.

A known measure against the aforementioned problem is an engine exhaust gas removing apparatus described in Japanese Patent Application Laid-Open No. HEI 4-194309. The engine exhaust gas removing apparatus includes a catalytic converter disposed in an exhaust passage, a bypass passage connected to the exhaust passage and bypassing the catalytic converter, a filter chamber disposed in the bypass passage, a recovery passage connected between a portion of the bypass passage extending downstream of the filter chamber and a portion of the exhaust passage extending upstream of the catalytic converter. In addition, a first open-close valve opens and closes the exhaust passage portion upstream of the catalytic converter, a second open-close valve opens and closes the recovery passage, a third open-close valve opens and closes a portion of the bypass passage extending downstream of the connecting portion between the bypass passage and the recovery passage, and a flow adjusting valve adjusts the amount of exhaust gas flowing into the filter chamber provided in the bypass passage.

The filter chamber adsorbs unburned exhaust gas components when a predetermined temperature has not been reached, and the filter chamber desorbs the adsorbed unburned gas components when the predetermined temperature has been reached or exceeded. When the catalytic converter is not activated, the engine exhaust gas removing apparatus constructed as described above completely closes the first and second open-close valves and fully opens the third open-close valve and the flow adjusting valve in order to prevent exhaust gas from flowing into the catalytic converter. Therefore, the entire amount of exhaust gas is led to the exhaust passage portion downstream of the catalytic converter, via the bypass passage, so that unburned gas components in the exhaust gas are collected in the filter chamber.

When the catalytic converter is activated, the engine exhaust gas removing apparatus fully opens the first and second open-close valves and completely closes the third open-close valve and adjusts the flow adjusting valve to a desired opening, so that a major portion of exhaust gas flows into the catalytic converter and a small portion of exhaust gas flows into the filter chamber, and so that exhaust gas let out of (desorbed from) the filter chamber is led to the exhaust passage portion upstream of the catalytic converter via the recovery passage. In this situation, unburned gas components desorbed from the filter chamber are led to the exhaust passage portion upstream of the catalytic converter via the recovery passage, so that the unburned gas components, together with exhaust gas flowing from an upstream portion of the exhaust passage, flows into the catalytic converter and is subjected to the converting processes in the catalytic converter.

The catalytic converters that are disposed in the exhaust systems of internal combustion engines are represented by three-way catalyst devices, NOx-lessening catalyst devices and the like. The catalytic converters represented by these devices are able to eliminate or lessen unburned gas components and harmful gas components present in exhaust gas provided that the air-fuel ratio of inflowing exhaust gas is within a predetermined range. Therefore, when unburned gas components desorbed from the filter chamber are to be converted by a catalytic converter as mentioned above, it is necessary to set the air-fuel ratio of exhaust gas containing the unburned gas components to a predetermined air-fuel ratio.

In a technology proposed in conjunction with the aforementioned need in internal combustion engines, generally termed air-fuel ratio feedback control is performed in which the air-fuel ratio of exhaust gas flowing into the catalytic converter is detected, and the amount of fuel injected is adjusted so as to bring the actual air-fuel ratio of exhaust gas flowing into the catalytic converter to a desired air-fuel ratio.

It is also known that the catalytic converter has a certain oxygen storing capacity (OSC) and therefore is able to significantly lessen harmful gas components by utilizing the oxygen storing capacity even if the exhaust air-fuel ratio temporarily changes.

The engine exhaust gas removing apparatus described in Japanese Patent Application Laid-Open No. HEI 4-194309 opens the recovery passage so that the filter chamber releases the unburned gas components at the same time when the catalytic converter is activated. In some cases, therefore, the air-fuel ratio of exhaust gas flowing into the catalytic converter becomes an excessively rich ratio, so that harmful gas components and unburned gas components in exhaust gas are not processed by the catalytic converter. Thus, there is a problem of deterioration of emissions.

It may be conceivable to achieve a lean air-fuel ratio of exhaust gas in accordance with the amount of desorbed unburned gas components in the aforementioned case by reducing the fuel injection amount through utilization of the oxygen storing capacity of the catalytic converter and execution of the air-fuel ratio feedback control, so that the exhaust air-fuel ratio resulting from addition of the desorbed unburned gas components to exhaust gas becomes a predetermined air-fuel ratio. However, if large amounts of unburned gas components become desorbed from the filter chamber in unison, the amount of oxygen pre-stored in the catalytic converter due to the oxygen storing capacity is instantly consumed, so that it may become impossible to process the unburned gas components in the catalytic converter before the air-fuel ratio feedback control is reflected in the actual exhaust air-fuel ratio. Furthermore, the engine air-fuel ratio temporarily becomes an excessively lean air-fuel ratio, so that the operating condition of the internal combustion engine may become unstable.

Still further, in order to realize the air-fuel ratio feedback control, it is necessary to provide an air-fuel ratio sensor or the like in a portion of the exhaust passage extending upstream of the catalytic converter. However, ordinary air-fuel ratio sensors are able to detect accurate air-fuel ratio provided that the exhaust air-fuel ratio is within a predetermined range. If the exhaust air-fuel ratio becomes a rich air-fuel ratio beyond the detection range of such an ordinary air-fuel ratio sensor due to large amounts of unburned gas components desorbed from the filter chamber, the air-fuel ratio sensor fails to detect an accurate exhaust air-fuel ratio, so that the precision of the air-fuel ratio feedback control deteriorates, resulting in deterioration of emissions.

SUMMARY OF THE INVENTION

Accordingly, it is an object of the invention to prevent deterioration of emissions from being caused by unburned gas components desorbed from an adsorbent provided in an internal combustion engine system for adsorbing unburned gas components of exhaust gas, by preventing the unburned gas components desorbed from the adsorbent from flowing into an exhaust gas-purifying catalyst device in unison.

In accordance with an aspect of the invention, an emission control apparatus includes a catalyst device provided in a main exhaust passage of the internal combustion engine for lessening a harmful gas component of exhaust gas, a bypass passage bypassing a portion of the main exhaust passage that is located upstream of the catalyst device, an adsorbent that is provided in the bypass passage and that adsorbs an unburned gas component of exhaust gas when having a temperature below a predetermined temperature, and that releases the unburned gas component when having a temperature equal to or higher than the predetermined temperature. In addition, a passage switching device switches between flow of exhaust gas to the main exhaust passage and flow of exhaust gas to the bypass passage, and flow that occurs through the bypass passage when the unburned gas component is desorbed from the adsorbent is controlled so that the flow through the bypass passage assumes a proportion equal to or less than a predetermined proportion relative to a flow through the main exhaust passage.

In the emission control apparatus constructed as described above, the passage switching device operates so as to cause the entire amount of exhaust gas to flow through the bypass passage when the exhaust gas-purifying catalyst is not activated, for example, at the time of cold start of the internal combustion engine. In this situation, the entire amount of exhaust gas discharged from the internal combustion engine passes through the adsorbent disposed in the bypass passage. Therefore, unburned gas components present in exhaust gas are entirely adsorbed to the adsorbent and are not let out into the atmosphere.

After the exhaust gas-purifying catalyst is activated, the passage switching device operates so as to cause exhaust gas to flow through both the main exhaust passage and the bypass passage. In this situation, exhaust gas from the internal combustion engine flows into the exhaust gas-purifying catalyst device via the main exhaust passage and the bypass passage. However, the amount of the flow through the bypass passage is controlled so that the flow through the bypass passage assumes a proportion equal to or less than (i.e., not greater than) a predetermined proportion relative to the flow through the main exhaust passage. Therefore, a major portion of exhaust gas flows into the exhaust gas-purifying catalyst device via the main exhaust passage, and the small remainder portion flows into the exhaust gas-purifying catalyst device via the bypass passage.

That is, the flow of exhaust gas through the adsorbent becomes small, so that the temperature increasing rate of the adsorbent becomes low. As a result, the desorption of unburned gas components from the adsorbent proceeds at a slow rate, and an undesired event in which the unburned gas components adsorbed to the adsorbent are desorbed therefrom and flow into the exhaust gas-purifying catalyst device in unison (i.e., in large amounts at one time) is prevented. Therefore, the air-fuel ratio of exhaust gas flowing into the exhaust gas-purifying catalyst device will not deviate from a range of air-fuel ratio in which the exhaust gas-purifying catalyst device is able to significantly lessen harmful exhaust gas components.

Furthermore, since the flow through the bypass passage is controlled so that the flow through the bypass passage assumes a substantially constant proportion equal to or less than the predetermined proportion relative to the flow through the main exhaust passage, the proportion of the amount of exhaust gas flowing into the exhaust gas-purifying catalyst device via the bypass passage to the amount of exhaust gas flowing into the exhaust gas-purifying catalyst device via the main exhaust passage becomes substantially constant. Therefore, even when the flow of exhaust gas discharged from the internal combustion engine changes, the change in the air-fuel ratio of exhaust gas flowing into the exhaust gas-purifying catalyst device is curbed.

The flow through the bypass passage also may be controlled so that the flow through the bypass passage becomes a constant flow regardless of the flow through the main exhaust passage.

The flow through the bypass passage may be controlled by arranging the bypass passage at such a position that a differential pressure occurring between an exhaust gas inlet portion of the bypass passage and an exhaust gas outlet portion of the bypass passage becomes equal to or less than a predetermined pressure. The flow through the bypass passage varies in accordance with the pressure difference between the exhaust gas inlet portion and the exhaust gas outlet portion. Therefore, by keeping the pressure difference between the exhaust gas inlet portion and the exhaust gas outlet portion equal to or less than the predetermined pressure, the flow through the bypass passage can be kept equal to or less than the predetermined flow.

The bypass passage may be disposed in such a manner that the exhaust gas inlet portion of the bypass passage is disposed at a position in the main exhaust passage adjacent to and upstream of the passage switching device, and such that the exhaust gas outlet portion of the bypass passage is disposed at a position in the main exhaust passage adjacent to and downstream of the passage switching device.

If the exhaust gas inlet portion and the exhaust gas outlet portion of the bypass passage are disposed at adjacent positions as described above, the pressure difference between the exhaust gas inlet portion and the exhaust gas outlet portion and the exhaust pulsation phase difference therebetween become small, so that the flow through the bypass passage can be made very small.

The adsorbent and the bypass passage may be arranged coaxially with the main exhaust passage. In this case, it is also possible to arrange an annular adsorbent and an annular bypass passage around the main exhaust passage in order to miniaturize the emission control apparatus and thereby make it easier to install the device in a vehicle. Furthermore, the adsorbent and the bypass passage may be arranged coaxially with the catalyst device disposed in the main exhaust passage. As a result, it becomes possible to shift the position of the exhaust gas-purifying catalyst device in the exhaust system closer to the internal combustion engine. In such an arrangement, higher-temperature exhaust gas flows through the exhaust gas-purifying catalyst device, so that the catalyst device can be activated in a shorter period (i.e., at an earlier time).

If the adsorbent, the bypass passage and the main exhaust passage are coaxially arranged, the bypass passage may be provided with at least one retainer for preventing the bypass passage from deforming. In this case, the bypass flow control device adjusts the flow through the bypass passage by adjusting one of a shape, a number and a position of the at least one retainer.

Since the provision of retainers in the bypass passage reduces the passage area of the bypass passage, a desired exhaust gas flow through the bypass passage can be achieved by optimizing the shape, the number and/or the position of the retainers.

Furthermore, a damper chamber for damping exhaust pulsation may be formed in the pathway of the bypass passage.

Each of the exhaust gas inlet portion of the bypass passage and the exhaust gas outlet portion of the bypass passage may have a shape such that a differential pressure occurring between the exhaust gas inlet portion and the exhaust gas outlet portion becomes equal to or less than a predetermined pressure.

The emission control apparatus may further include an air-fuel ratio sensor that detects at least an air-fuel ratio of exhaust gas downstream of the adsorbent, and an air-fuel ratio adjusting device for adjusting the air-fuel ratio of exhaust gas so that a value of an output signal of the air-fuel ratio sensor becomes equal to a target air-fuel ratio. Since the flow through the bypass passage is controlled such that the flow of exhaust gas through the adsorbent assumes a proportion equal to or less than the predetermined proportion relative to the flow of exhaust gas through the main exhaust passage, the change in the air-fuel ratio of exhaust gas flowing into the exhaust gas-purifying catalyst device is curbed. Therefore, the air-fuel ratio adjusting device can easily bring the air-fuel ratio of exhaust gas flowing into the exhaust gas-purifying catalyst device to a desired air-fuel ratio, that is, an air-fuel ratio that optimizes the exhaust gas-purifying efficiency of the catalyst device.

The flow through the bypass passage may be controlled by detecting a pressure difference between the exhaust gas inlet portion of the bypass passage and the exhaust gas outlet portion of the bypass passage, and then controlling the passage switching device so that the pressure difference becomes equal to or less than a predetermined value. Furthermore, a detector may detect at least one of an amount of the unburned gas component present in exhaust gas and an air-fuel ratio of exhaust gas downstream of the adsorbent, and may control the passage switching device so that the at least one of the amount of the unburned gas component and the air-fuel ratio of exhaust gas becomes constant.

BRIEF DESCRIPTION OF THE DRAWINGS

The foregoing and further objects, features and advantages of the present invention will become apparent from the following description of preferred embodiments with reference to the accompanying drawings, in which like numerals are used to represent like elements and wherein.

DETAILED DESCRIPTION OF PREFERRED EMBODIMENTS

Preferred embodiments of the emission control apparatus of the invention will be described hereinafter with reference to the accompanying drawings.

Figure 1:
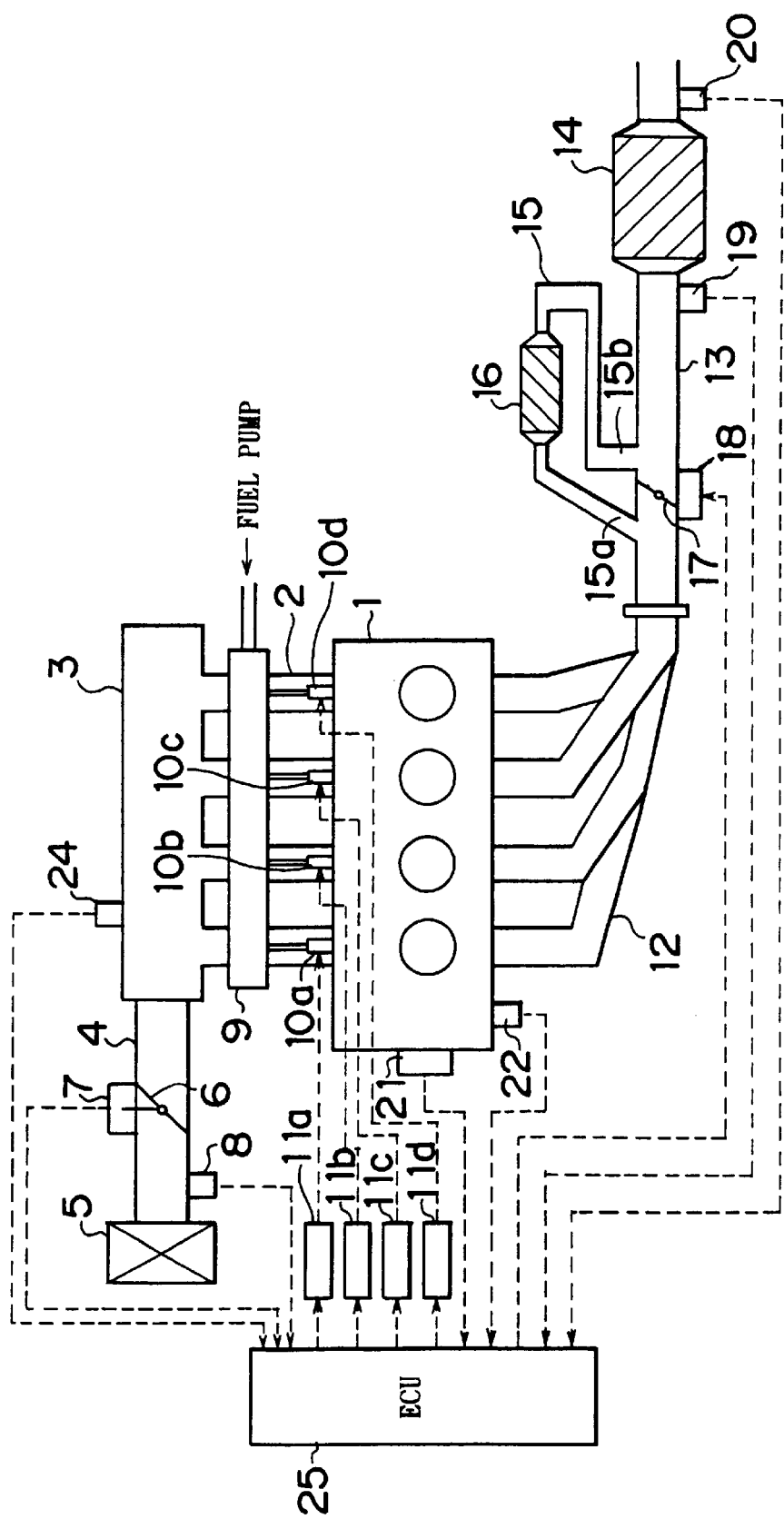
FIG. 1 is a schematic illustration of a construction of an internal combustion engine to which the emission control apparatus of the invention is applied.

FIG. 1 is a schematic illustration of the construction of an internal combustion engine, including its intake-exhaust system, to which the emission control apparatus of the invention is applied. The internal combustion engine shown in FIG. 1 is a four-stroke four-cylinder internal combustion engine 1. An intake manifold 2 is connected to the internal combustion engine 1 in such a manner that each branch pipe of the intake manifold 2 communicates with a combustion chamber of a corresponding one of the cylinders via a corresponding intake port (not shown).

The intake manifold 2 is connected to a surge tank 3. The surge tank 3 is connected to an air cleaner box 5 via an intake pipe 4. The intake pipe 4 is provided with a throttle valve 6 that cooperates with an accelerator pedal (not shown) to adjust the flow of intake air through the intake pipe 4. The throttle valve 6 is provided with a throttle position sensor 7 that outputs an electric signal in accordance with the opening amount of the throttle valve 6.

The intake pipe 4 is provided with an air flow meter 8 that outputs an electric signal corresponding to the mass of intake air flowing through the intake pipe 4. The surge tank 3 is provided with a vacuum sensor 24 that outputs an electric signal in accordance with the pressure in the surge tank 3.

Each branch pipe of the intake manifold 2 is provided with a fuel injection valve 10a, 10b, 10c, 10d (hereinafter, collectively referred to as "fuel injection valves 10"). The fuel injection valves 10 are connected to a fuel distributing pipe 9. The fuel distributing pipe 9 distributes fuel pumped thereto by a fuel pump (not shown) to the individual fuel injection valves 10.

The fuel injection valves 10 are provided with drive circuits 11a, 11b, 11c, 11d (hereinafter, collectively referred to as "drive circuits 11"), respectively. When a drive circuit 11 applies a drive current to its corresponding fuel injection valve 10, the fuel injection valve opens so that fuel supplied from the fuel distributing pipe 9 is injected toward the intake port of the corresponding cylinder.

An exhaust manifold 12 is connected to the internal combustion engine 1. Each branch pipe of the exhaust manifold 12 communicates with the combustion chamber of the corresponding cylinder via a corresponding exhaust port (not shown). The exhaust manifold 12 is connected to an exhaust pipe 13. The exhaust pipe 13 is connected at its downstream end to a muffler (not shown).

A three-way catalyst device 14 is provided in the pathway of the exhaust pipe 13, as an exhaust gas-purifying catalyst device according to the invention. The three-way catalyst device 14 is formed by a ceramic support that is formed from cordierite into a grating configuration having a plurality of through-holes extending in the flowing direction of exhaust gas, and a catalyst layer coated on a surface of the ceramic support. The catalyst layer is formed by loading a surface of a porous alumina ($Al_2O_3$) material having many pores, with platinum-rhodium (Pt—Rh)-based precious metal catalysts.

The three-way catalyst device 14 activates when the temperature thereof is equal to or higher than a predetermined temperature. If the exhaust air-fuel ratio flowing into the three-way catalyst device 14 is near the theoretical air-fuel ratio, the three-way catalyst device 14 causes hydrocarbons (HC) and carbon monoxide (CO) present in exhaust gas to react with oxygen $O_2$ present in exhaust gas and thereby oxidizes HC and CO into $H_2O$ and $CO_2$, and causes NOx present in exhaust gas to react with HC and CO present in exhaust gas and thereby reduces NOx into $H_2O$, $CO_2$ and $N_2$.

A portion of the exhaust pipe 13 extending upstream of the three-way catalyst device 14 is provided with an upstream air-fuel ratio sensor 19 that outputs an electric signal corresponding to the air-fuel ratio of exhaust gas flowing into the three-way catalyst device 14. A portion of the exhaust pipe 13 extending downstream of the three-way catalyst device 14 is provided with a downstream air-fuel ratio sensor 20 that outputs an electric signal corresponding to the air-fuel ratio of exhaust gas let out of the three-way catalyst device 14.

Each of the upstream air-fuel ratio sensor 19 and the downstream air-fuel ratio sensor 20 is, for example, a sensor that is substantially made up of a tubular solid electrolyte portion formed by firing zirconia ($ZrO_2$), an outside platinum electrode covering an outside surface of the solid electrolyte portion, and an inside platinum electrode covering an inside surface of the solid electrolyte portion. Additionally, each sensor outputs an electric current proportional to the oxygen concentration in exhaust gas (i.e., the concentration of unburned gas components if the air-fuel ratio is in the rich side of the theoretical air-fuel ratio) as oxygen ions migrate upon application of a voltage between the electrodes.

A bypass passage 15 bypassing a portion of the exhaust pipe 13 is connected to a portion of the exhaust pipe 13 extending upstream of the three-way catalyst device 14. Provided in the pathway of the bypass passage 15 is an adsorbent 16 that adsorbs unburned gas components of exhaust gas when the temperature of the adsorbent 16 is below a predetermined temperature and that releases unburned gas components from adsorption at or above the predetermined temperature.

An exhaust gas inlet portion 15a and an exhaust gas outlet portion 15b of the bypass passage 15 are connected to the exhaust pipe 13 at adjacent positions. A portion of the exhaust pipe 13 located between the exhaust gas inlet portion 15a and the exhaust gas outlet portion 15b, that is, a portion of the exhaust pipe 13 bypassed by the bypass passage 15, is provided with an open-close valve 17 that opens and closes the passage of the exhaust pipe 13. The open-close valve 17 is provided with an actuator 18 that is formed by a stepper motor and the like so as to open or close the open-close valve 17 in accordance with the magnitude of a current applied thereto. The open-close valve 17 and the actuator 18 form a passage switching device according to this embodiment of the invention.

The exhaust gas inlet portion 15a and the exhaust gas outlet portion 15b of the bypass passage 15 are disposed in such a manner that when the open-close valve 17 is fully opened, the difference between the exhaust gas pressure near the exhaust gas inlet portion 15a and the exhaust gas pressure near the exhaust gas outlet portion 15b is 2 kPa or less and, more preferably, 1 kPa or less.

It is also preferred that the exhaust gas inlet portion 15a and the exhaust gas outlet portion 15b of the bypass passage 15 be disposed at such positions that the ratio between the exhaust gas flow through the exhaust pipe 13 and the exhaust gas flow through the bypass passage 15 becomes equal to or less than a predetermined value regardless of the operating condition of the internal combustion engine 1. This position setting is preferable in order to limit, to a predetermined range, the rate of the change of the air-fuel ratio that is caused by unburned gas components mixing into exhaust gas when unburned gas components are desorbed from the adsorbent 16, regardless of the operating condition of the internal combustion engine 1. More specifically, an upper limit of the amount of unburned gas components discharged from the bypass passage 15 into the exhaust pipe 13 in a unit time is determined such that the air-fuel ratio of a mixture gas of unburned gas components desorbed from the adsorbent 16 and exhaust gas remains within a range that allows the three-way catalyst device 14 to sufficiently purify the mixture gas.

In the case of a vehicle in which the air-fuel ratio feedback control is performed, the upper limit is determined such that the emission quality is not further degraded, because changes in the air-fuel ratio of the mixture gas change the air-fuel ratio of a fuel mixture gas in the internal combustion engine 1. The positional relationship between the exhaust gas inlet portion 15a and the exhaust gas outlet portion 15b of the bypass passage 15 is determined so that the ratio between the flow of exhaust gas through the exhaust pipe 13 and the flow of exhaust gas through the bypass passage 15 will not exceed the upper limit. Furthermore, when sent into the bypass passage 15, exhaust gas increases the temperature of the adsorbent 16. In order to prevent deterioration of emission quality, it is necessary that the temperature of the three-way catalyst device 14 reach or exceed an activation temperature that allows the three-way catalyst device 14 to significantly lessen unburned gas components, before unburned gas components are desorbed from the adsorbent 16 due to a temperature increase in the adsorbent 16. The warming of the adsorbent 16 and the warming of the three-way catalyst device 14 depends on the flows of exhaust gas through the adsorbent 16 and the three-way catalyst device 14, respectively. Therefore, the upper limit of the ratio between the exhaust gas flow through the exhaust pipe 13 and the exhaust gas flow through the bypass passage 15 is determined so that the three-way catalyst device 14 assumes the activation temperature before the adsorbent starts desorbing unburned gas components. In this embodiment, the arrangement of the exhaust gas inlet portion 15a and the exhaust gas outlet portion 15b of the bypass passage 15 is determined so that the ratio between the exhaust gas flow through the bypass passage 15 and the exhaust gas flow through the exhaust pipe 13 always remains equal to or less than 10% and, more preferably, equal to or less than 1%, regardless of the operating condition of the internal combustion engine.

The internal combustion engine 1 has a crank position sensor 21 that outputs a pulse signal at every predetermined rotational angle (e.g., 30°) of a crankshaft (not shown), and a water temperature sensor 22 that outputs an electric signal corresponding to the temperature of cooling water flowing in a waterjacket (not shown) of the internal combustion engine 1.

The crank position sensor 21, the water temperature sensor 22, the throttle position sensor 7, the air flow meter 8, the vacuum sensor 24, the upstream air-fuel ratio sensor 19 and the downstream air-fuel ratio sensor 20 are connected to an engine-controlling electronic control unit (ECU) 25 by their respective wirings so that the signal from each sensor is input to the ECU 25. Using the output signals of the sensors, the ECU 25 determines an operating condition of the internal combustion engine 1. In accordance with the determined operating condition, the ECU 25 performs various controls such as the fuel injection control, the ignition control, the open-close control of the open-close valve 17, and the like.

Figure 2:
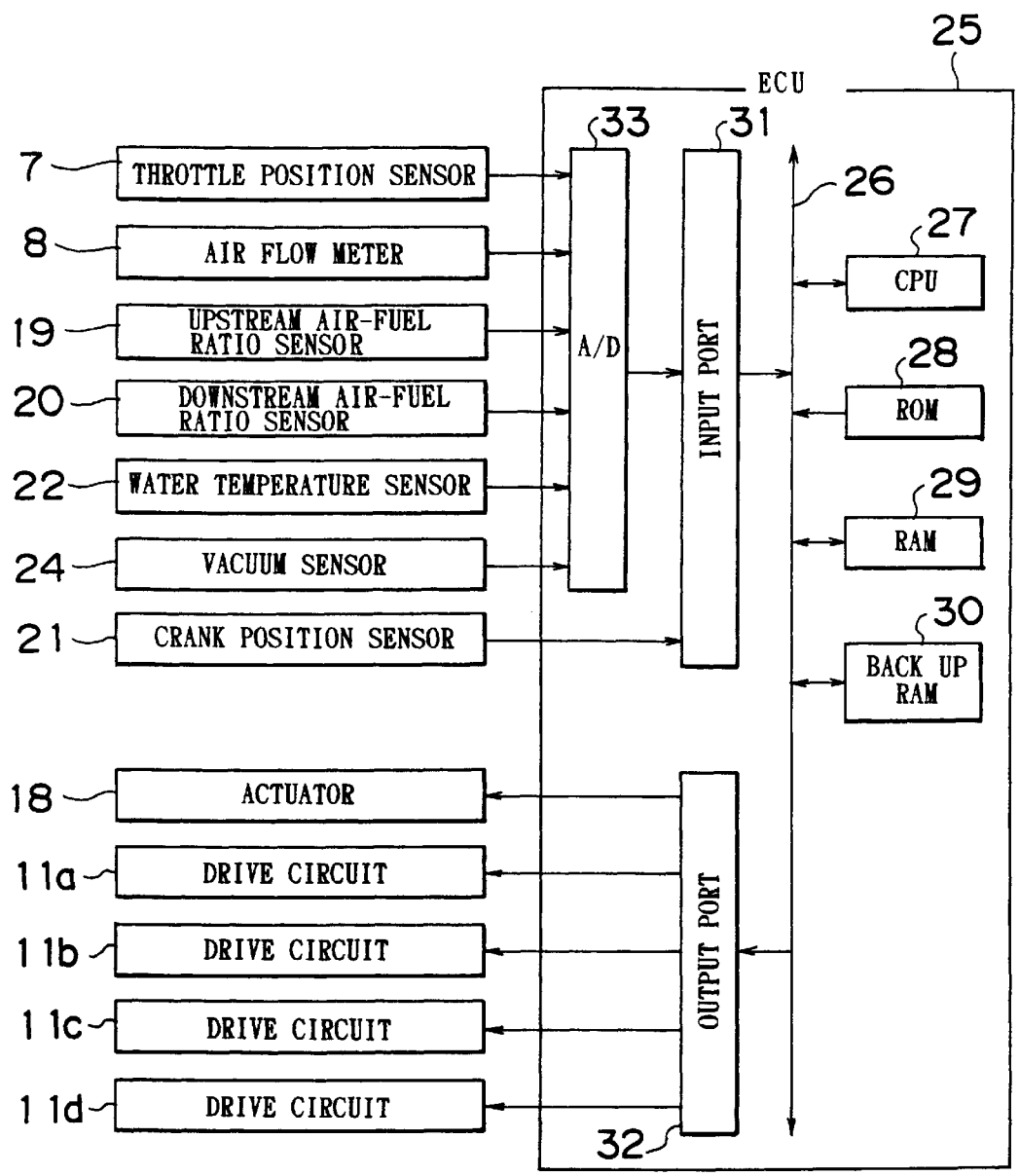
FIG. 2 is a block diagram illustrating the internal construction of an ECU shown in FIG. 1.

Referring to FIG. 2, the ECU 25 has a CPU 27, a ROM 28, a RAM 29, a backup RAM 30, an input port 31, and an output port 32 that are interconnected by a bi-directional bus 26. The ECU 25 further has an A/D converter 33 that is connected to the input port 31.

The input port 31 receives output signals of the crank position sensor 21 and the like, and sends the output signals to the CPU 27 and to the RAM 29. The input port 31 also receives output signals of the throttle position sensor 7, the air flow meter 8, the upstream air-fuel ratio sensor 19, the downstream air-fuel ratio sensor 20, the water temperature sensor 22, the vacuum sensor 24 and the like, via the A/D converter 33, and sends the output signals to the CPU 27 and to the RAM 29.

The output port 32 sends control signals from the CPU 27 to the actuator 18 and to the drive circuits 11.

The ROM 28 stores application programs of, for example, a fuel injection amount control routine for determining an amount of fuel to be injected from each fuel injection valve 10, an air-fuel ratio feedback control routine for executing the air-fuel ratio feedback control of the fuel injection amount, a fuel injection timing control routine for determining a fuel injection timing of each fuel injection valve 10, a passage switch control routine for controlling the open-close valve 17, and the like. The ROM 28 also stores various control maps.

The control maps include, for example, a fuel injection amount control map indicating a relationship between the fuel injection amount and the operating condition of the internal combustion engine 1, a fuel injection timing control map indicating a relationship between the fuel injection timing and the operating condition of the internal combustion engine 1, an activation determination control map indicating a relationship between the temperature of cooling water at the time of start of the internal combustion engine and the amount of time needed between the start of the engine and activation of the three-way catalyst device 14 (hereinafter, referred to as "catalytic activation time"), and the like.

The RAM 29 stores output signals from the various sensors, results of operations of the CPU 27, and the like. The results of operations include, for example, an engine revolution speed calculated from the output signal of the crank position sensor 21, and the like. The output signals of the various sensors, the results of operations of the CPU 27, and the like are rewritten to latest data every time the crank position sensor 21 outputs a signal.

The backup RAM 30 is a non-volatile memory capable of retaining data even after the internal combustion engine 1 is stopped.

The CPU 27 operates in accordance with the application programs stored in the ROM 28, and determines an operating condition of the internal combustion engine 1 on the basis of the output signals of the sensors stored in the RAM 29, and calculates a fuel injection amount, a fuel injection timing, an opening or closing timing of the open-close valve 17, and the like on the basis of the determined operating condition of the internal combustion engine 1 and the various control maps. Based on the fuel injection amount, the fuel injection timing, the opening or closing timing of the open-close valve 17, and the like, the CPU 27 controls the drive circuits 11 and the actuator 18.

For example, to perform the fuel injection control, the CPU 27 follows the fuel injection amount control routine, and determines a fuel injection amount (TAU) by the following equation:

$$TAU = TP*FWL*(FAF+FG)*[FASE+FAE+FOTP+FDE(D)]*FFC+TAUV$$

TP: basic injection amount
FWL: warm-up increase
FAF: air-fuel ratio feedback correction factor
FG: air-fuel ratio learned factor
FASE: increase after start
FAE: acceleration increase
FOTP: OTP (Over Temperature Protection) increase
FDE(D): deceleration increase (decrease)
FFC: correction factor at the time of fuel cut return
TAUV: invalid fuel injection duration For the evaluation of the above equation, the CPU 27 determines an operating condition of the internal combustion engine 1 by using the values of output signals of the sensors as parameters. Based on the determined operating condition of the internal combustion engine 1 and the fuel injection amount control map stored in the ROM 28, the CPU 27 calculates the basic injection amount (TP), the warm-up increase (FWL), the increase after start (FASE), the acceleration increase (FAE), the OTP increase (FOTP), the deceleration increase (FDE(D)), the correction factor at the time of fuel cut return (FFC), the invalid injection duration (TAUV), and the like.

Figure 3:
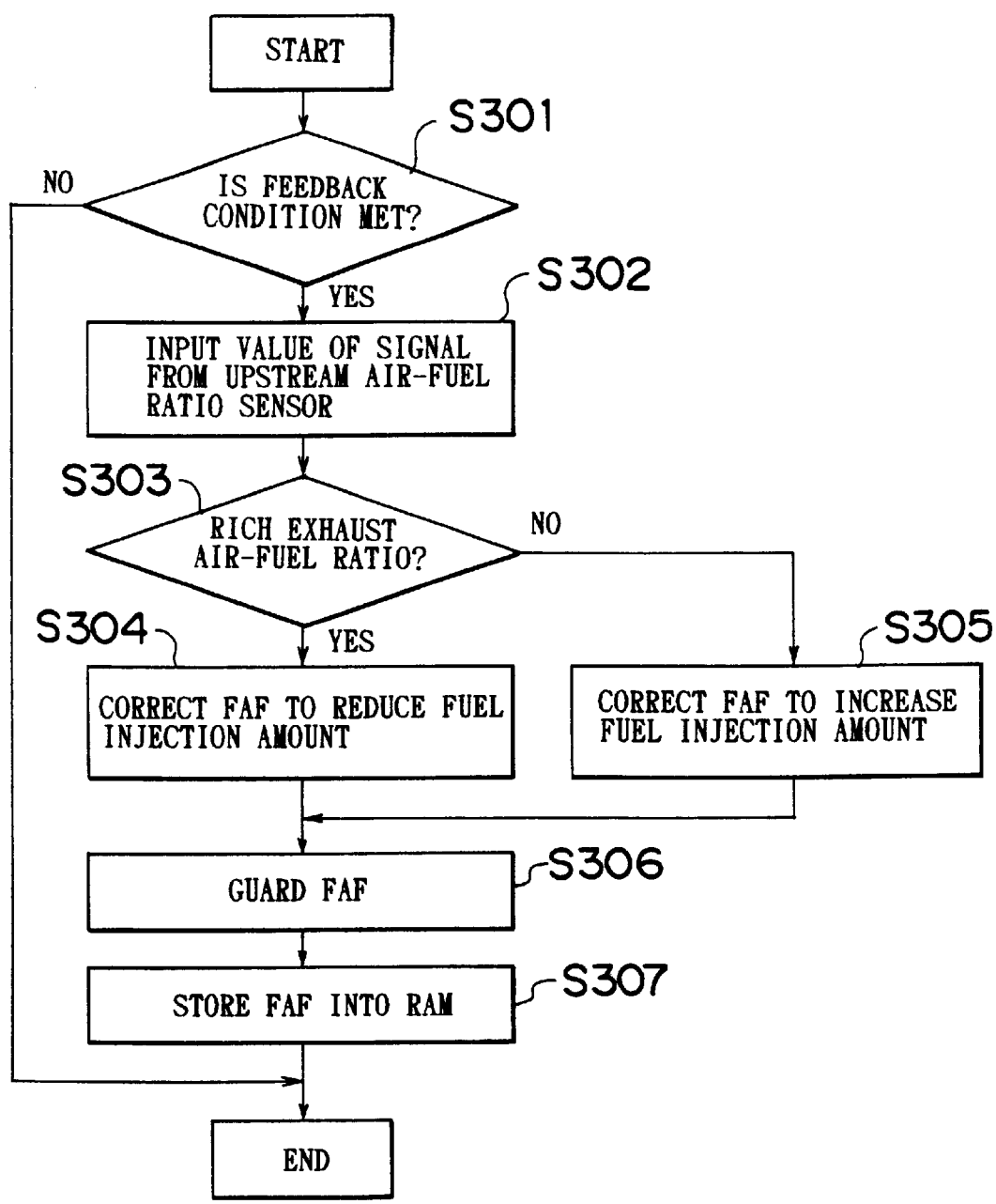
FIG. 3 is a flowchart illustrating an example of an air-fuel ratio feedback control routine.

Furthermore, the CPU 27 calculates an air-fuel ratio feedback correction factor (FAF) by following the air-fuel ratio feedback control routine as shown in FIG. 3. In the air-fuel ratio feedback control routine illustrated in FIG. 3, the CPU 27 first determines in step S301 whether an air-fuel ratio feedback control condition has been established. Examples of the air-fuel ratio feedback control condition include a condition that the cooling water temperature is equal to or higher than a predetermined temperature, a condition that the internal combustion engine 1 is not started, a condition that the increasing correction of the fuel injection amount after start of the engine is not performed, a condition that the warm-up increasing correction of the fuel injection amount is not performed, a condition that the acceleration increasing correction of the fuel injection amount is not performed, a condition that the OTP increasing correction for preventing overheating of exhaust-system component parts, such as the three-way catalyst device 14, is not performed, a condition that the fuel cut control is not performed, and the like.

If the CPU 27 determines in step S301 that the air-fuel ratio feedback control condition as mentioned above is not satisfied, the CPU 27 sets the air-fuel ratio feedback correction factor (FAF) to 1.0, and temporarily ends the execution of the routine.

If it is determined in step S301 that the air-fuel ratio feedback control condition is satisfied, the CPU 27 goes to step S302, in which the CPU 27 inputs the value of an output signal of the upstream air-fuel ratio sensor 19 via the A/D converter 33. In step S303, the CPU 27 determines whether the actual exhaust air-fuel ratio is in the fuel-rich (or fuel-lean) side of the theoretical air-fuel ratio on the basis of the values of output signals input in step S302 and the response delay time of the upstream air-fuel ratio sensor 19. If it is determined in step S303 that the exhaust air-fuel ratio is in the rich side of the theoretical air-fuel ratio, the CPU 27 goes to step 304, in which the CPU 27 corrects the value of the air-fuel ratio feedback correction factor (FAF) so as to perform the decreasing correction of the fuel injection amount (TAU). If it is determined in step S303 that the exhaust air-fuel ratio is in the lean side of the theoretical air-fuel ratio, the CPU 27 goes to step S305, in which the CPU 27 corrects the value of the air-fuel ratio feedback correction factor (FAF) so as to perform the increasing correction of the fuel injection amount (TAU).

After executing step S304 or step S305, the CPU 27 goes to step S306, in which the CPU 27 performs an upper limit guarding process and a lower limit guarding process on the air-fuel ratio feedback correction factor (FAF) calculated in step S304 or step S305. Subsequently in step S307, the CPU 27 stores the air-fuel ratio feedback correction factor guard-processed in step S304 or step S305 into a predetermined area in the RAM 29. Then, the CPU 27 temporarily ends the execution of the routine.

Concurrently with the air-fuel ratio feedback control (first air-fuel ratio feedback control) based on output signals of the upstream air-fuel ratio sensor 19 as described above, the CPU 27 executes an air-fuel ratio feedback control (second air-fuel ratio feedback control) based on output signals of the downstream air-fuel ratio sensor 20.

In the second air-fuel ratio feedback control, the CPU 27 compares the value of an output signal of the downstream air-fuel ratio sensor 20 with a predetermined reference voltage to determine whether the air-fuel ratio of exhaust gas flowing out of the three-way catalyst device 14 is a fuel-lean ratio or a fuel-rich ratio. Based on the determination, the CPU 27 corrects a criterion value for the rich/lean determination in the first air-fuel ratio feedback control, a correction amount of the air-fuel ratio feedback correction factor (FAF), and the like. Thereby, the CPU 27 curbs, for example, the deterioration of emissions caused by variations in the output characteristic of the upstream air-fuel ratio sensor 19 due to differences among individual sensors, changes in the output characteristic of the upstream air-fuel ratio sensor 19 due to aging, and the like.

Subsequently, for the control of the open-close valve 17, the CPU 27 inputs an output signal of the water temperature sensor 22, and calculates a catalytic activation time based on the output signal of the water temperature sensor 22 and the activation determination control map stored in the ROM 28, when the internal combustion engine 1 is started. The CPU 27 then outputs a control signal to the actuator 18 so as to maintain a completely closed state of the open-close valve 17 (a non-conductive state of the exhaust pipe 13) as shown in FIG. 1 until the catalytic activation time elapses, that is, while the three-way catalyst device 14 is in a not-activated state. The entire amount of exhaust gas discharged from the internal combustion engine 1 is led to the bypass passage 15 so as to pass through the adsorbent 16 before flowing into the three-way catalyst device 14. Therefore, unburned gas components contained in exhaust gas are not let out into the atmosphere, but are adsorbed by the adsorbent 16.

Figure 4:
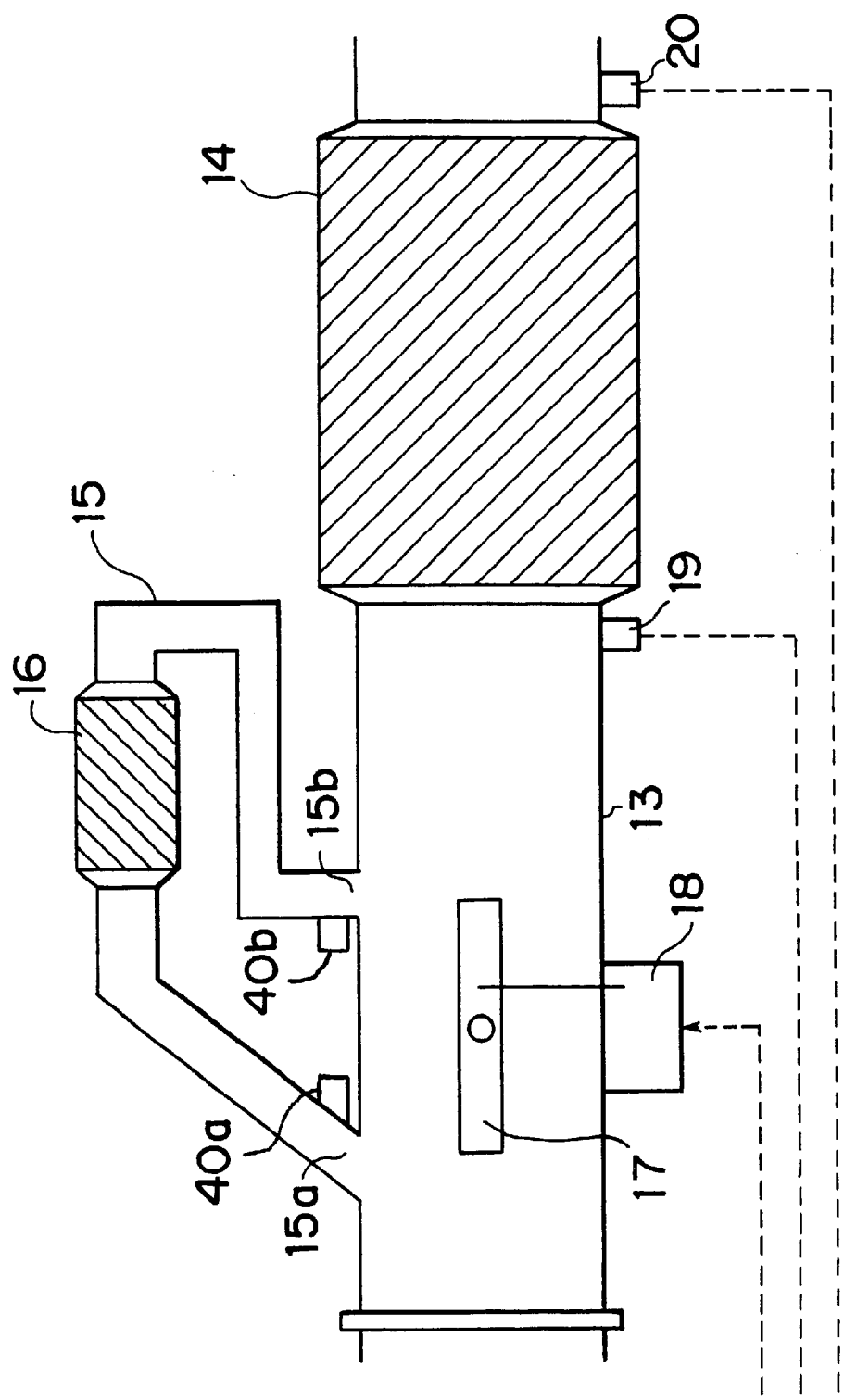
FIG. 4 illustrates operation of an open-close valve.

After the catalytic activation time elapses, that is, after the three-way catalyst device 14 activates, the CPU 27 outputs a control signal to the actuator 18 so as to establish a fully open state of the open-close valve 17 (a conductive state of the exhaust pipe 13) as shown in FIG. 4.

In this situation, both the exhaust pipe 13 and the bypass passage 15 are in the conductive state, so that exhaust gas discharged from the internal combustion engine 1 flows parallel through the bypass passage 15 and the exhaust pipe 13 before flowing into the three-way catalyst device 14.

Since the exhaust gas inlet portion 15a and the exhaust gas outlet portion 15b of the bypass passage 15 are adjacent to each other, the difference between the exhaust gas pressure near the exhaust gas inlet portion 15a and the exhaust gas pressure near the exhaust gas outlet portion 15b is small, and the phase difference between the pulsating flow of exhaust gas through a portion of the exhaust pipe 13 located near the exhaust gas inlet portion 15a and the pulsating flow of exhaust gas through a portion of the exhaust pipe 13 located near the exhaust gas outlet portion 15b is small. Therefore, of the entire amount of exhaust gas discharged from the internal combustion engine 1, only a very small portion flows into the three-way catalyst device 14 via the bypass passage 15. Rather, the major portion of the exhaust gas flows into the three-way catalyst device 14 via the exhaust pipe 13 without flowing through the bypass passage 15.

When the flow through the bypass passage 15 is very small, the flow of exhaust gas through the adsorbent 16 correspondingly becomes very small, so that the temperature increasing rate of the adsorbent 16 becomes small or gradual. Therefore, the unburned gas components adsorbed to the adsorbent 16 are gradually desorbed therefrom little by little.

As a result, the amount of unburned gas components introduced from the bypass passage 15 into a portion of the exhaust pipe 13 upstream of the three-way catalyst device 14 becomes very small, so that the air-fuel ratio of exhaust gas flowing into the three-way catalyst device 14 will not excessively change (to an excessively rich ratio).

Therefore, the air-fuel ratio of exhaust gas flowing into the three-way catalyst device 14 will not deviate from a range of air-fuel ratio that allows the three-way catalyst device 14 to significantly lessen HC, CO, NOx. Hence, the three-way catalyst device 14 reliably achieves significant reductions of the amounts of unburned gas components and harmful gas components present in exhaust gas, so that emissions will not deteriorate.

Furthermore, since the air-fuel ratio of exhaust gas flowing into the three-way catalyst device 14 does not excessively change (to an excessively rich ratio), the detection precision of the upstream air-fuel ratio sensor 19 and the downstream air-fuel ratio sensor 20 will not decrease. Therefore, it becomes possible to perform the air-fuel ratio feedback control with high precision.

If unburned gas components are slowly desorbed from the adsorbent 16 mix into exhaust gas, the shift of the exhaust air-fuel ratio to a richer ratio thereby caused is very small. Therefore, an undesired event in which the air-fuel ratio feedback control results in an excessively lean engine air-fuel ratio (air-fuel ratio of a mixture to be burned in the cylinder block 1) is prevented from occurring, so that an unstable operating condition of the internal combustion engine 1 is prevented.

Furthermore, the ratio of the flow of exhaust gas through the bypass passage 15 to the flow of exhaust gas through the exhaust pipe 13 becomes equal to a substantially constant value that is equal to or less than a predetermined value, so that the rate of the change in the exhaust air-fuel ratio caused by unburned gas components desorbed from the adsorbent 16 mixing into exhaust gas can be stabilized regardless of the operating condition of the internal combustion engine 1. Therefore, the air-fuel ratio feedback control is not complicated. Hence, stable air-fuel ratio feedback control can be realized.

Still further, in the emission control apparatus of this embodiment of the invention, the ratio of the flow of exhaust gas through the bypass passage 15 to the flow of exhaust gas through the exhaust pipe 13 becomes a substantially constant value equal to or less than the predetermined value without requiring control of the flow through the bypass passage 15 when the open-close valve 17 is in a fully open state. Therefore, there is no need to provide a flow adjusting valve or the like in the side of the inlet to the bypass passage 15. Hence, it becomes possible to simplify the construction of the apparatus and the control thereof.

Although in the foregoing embodiment, the open-close valve 17 is kept in the fully open state after the three-way catalyst device 14 is activated, it is also possible to adopt a construction in which the exhaust gas inlet portion 15a and the exhaust gas outlet portion 15b of the bypass passage 15 are provided with pressure sensors 40a and 40b (see FIG. 4) and a pressure difference between the exhaust gas inlet portion 15a and the exhaust gas outlet portion 15b is detected based on the difference between the outputs of the two pressure sensors. In this construction, the opening amount of the open-close valve 17 is controlled so that the detected pressure difference becomes equal to a desired pressure difference. It is also possible to estimate an amount of unburned gas components present in exhaust gas or an air-fuel ratio of exhaust gas flowing downstream of the adsorbent 16 (upstream of the three-way catalyst device 14) from the value of an output signal of the upstream air-fuel ratio sensor 19 and to control the opening amount of the open-close valve 17 so that the amount of unburned gas components or the air-fuel ratio becomes constant.

A second embodiment of the internal combustion engine emission control apparatus of the invention will be described with reference to FIGS. 5 to 9. Features distinguishing the second embodiment from the first embodiment will mainly be described, and portions and arrangements comparable to those of the first embodiment will not be described again.

Figure 5:
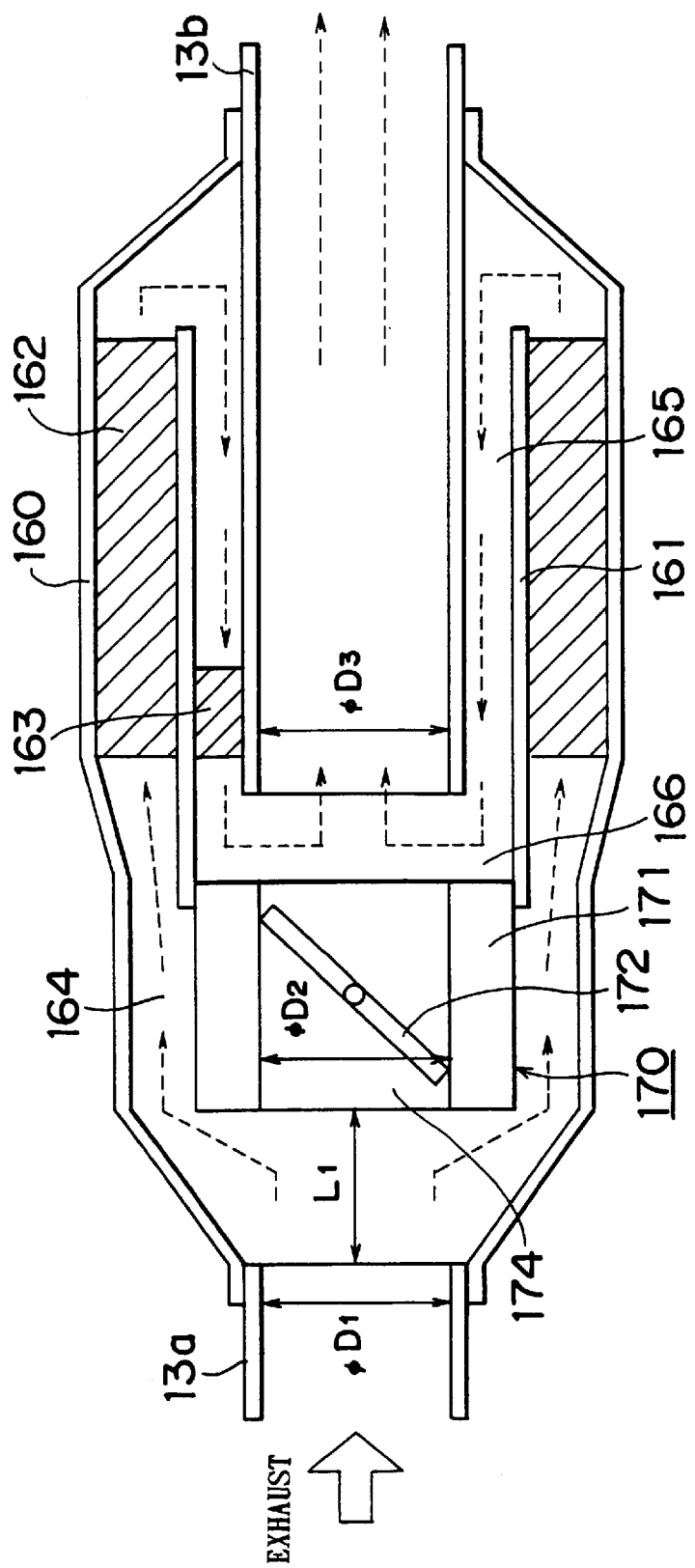
FIG. 5 illustrates a second embodiment of the emission control apparatus of the invention.

FIG. 5 illustrates an emission control apparatus according to the second embodiment of the invention. The emission control apparatus shown in FIG. 5 includes an outer tube 160 having an inside diameter that is greater than the outside diameter of an exhaust pipe 13, an inner tube 161 having an inside diameter greater than the outside diameter of the exhaust pipe 13 and having an outside diameter smaller than the inside diameter of the outer tube 160, and an annular adsorbent 162 disposed between the inner tube 161 and the outer tube 160.

The exhaust pipe 13 is divided into an upstream exhaust pipe 13a and a downstream exhaust pipe 13b that are spaced apart from each other within the outer tube 160. The upstream exhaust pipe 13a and the downstream exhaust pipe 13b are interconnected by the outer tube 160.

The downstream exhaust pipe 13b is connected to the outer tube 160 so that an upstream-side open end portion of the downstream exhaust pipe 13b extends into the outer tube 160 and a distal end thereof is a free (not fixed) end. Correspondingly, the inner tube 161 is held within the outer tube 160 in such a manner that one end of the inner tube 161 is fixed to one of the outer tube 160, the exhaust pipe 13 and a valve device 170 (described below) and the other end of the inner tube 161 is not fixed to any one of the outer tube 160, the exhaust pipe 13 and the valve device 170, and that an upstream-side end portion of the inner tube 161 extends further upstream of the upstream-side end of the downstream exhaust pipe 13b.

This construction is adopted for the following reasons. The outer tube 160 is fixed to the upstream exhaust pipe 13a and the downstream exhaust pipe 13b. The outer tube 160 is likely to have a lower temperature than the inner tube 161 and the downstream exhaust pipe 13b. Therefore, if both ends of the inner tube 161 or the upstream-side end of the downstream exhaust pipe 13b is fixed to the outer tube 160 directly or indirectly via the valve device 170, different thermal expansion rates of the outer tube 160, the inner tube 161 and the downstream exhaust pipe 13b will likely break the emission control apparatus, thereby degrading its durability.

The adsorbent 162 is fixed to only one of the outer tube 160 and the inner tube 161 in this embodiment. This construction is adopted for the following reasons. If the adsorbent 162 is fixed to both the outer tube 160 and the inner tube 161, different magnitudes of thermal expansion of the outer tube 160 and the inner tube 161 caused by different temperatures of the two tubes create a tensile force or a compressive force on the adsorbent 162, so that the adsorbent 162 may break.

Figure 6:
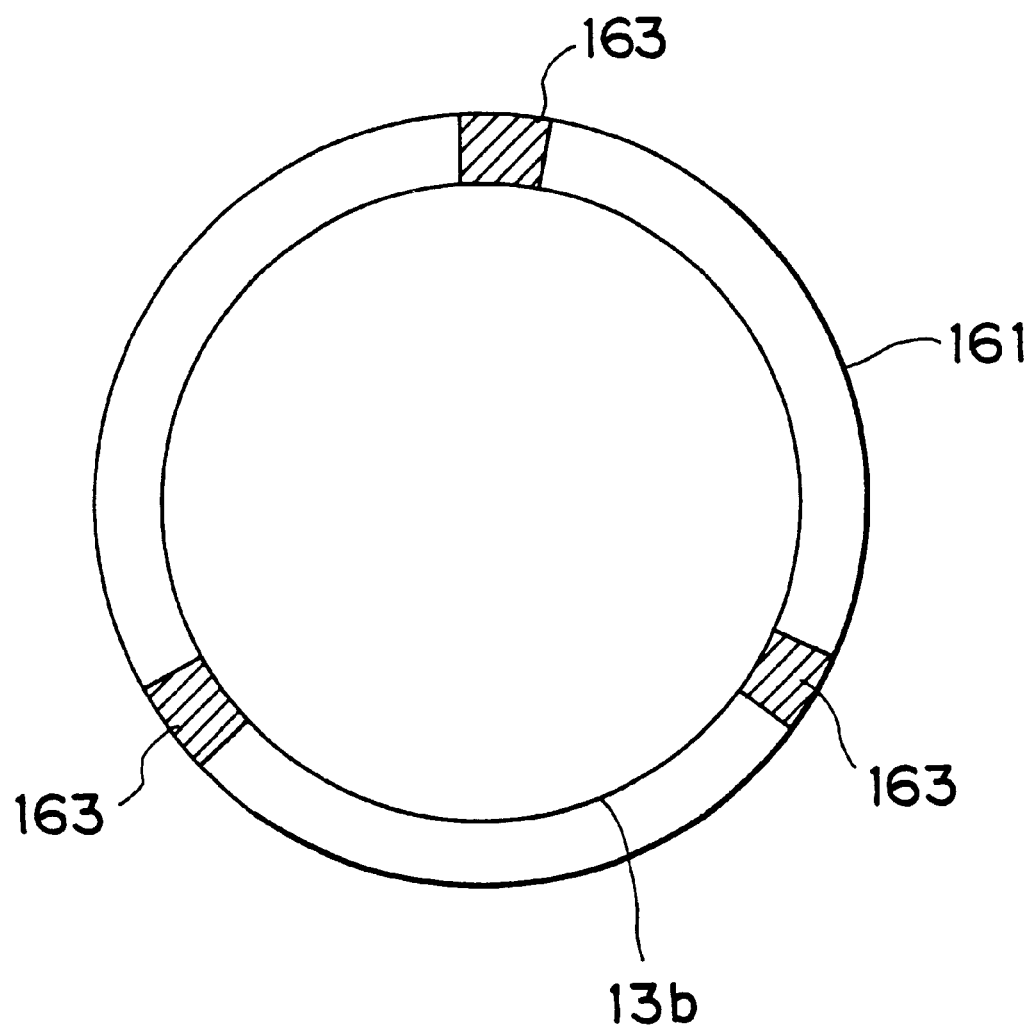
FIG. 6 illustrates the arrangement of retainers in the FIG. 5 apparatus.

Retaining members 163 are disposed at plural locations in a space formed between the inner tube 161 and the downstream exhaust pipe 13b as shown in FIG. 6, in order to enhance the vibration resistance of the downstream exhaust pipe 13b. Each of the retaining members 163 may be fixed to only one of the inner wall surface of the inner tube 161 and the outer wall surface of the downstream exhaust pipe 13b. In this construction, therefore, the adsorbent 162 and the downstream exhaust pipe 13b are associated with each other in a non-fixed state, so that the difference between thermal expansion of the downstream exhaust pipe 13b in a direction of the axis thereof and thermal expansion of the inner tube 161 in a direction of the axis can be absorbed.

The retaining members 163 may be formed by compressing a wire mesh material, so that differences in radial thermal expansion between the inner tube 161 and the downstream exhaust pipe 13b can also be absorbed. It is also possible to use honeycomb pieces as the retaining members 163 and to coat the honeycomb pieces with an adsorbent. As a result, the unburned gas component-adsorbing capacity can be increased without changing the configuration or size of the entire apparatus.

Figure 7:
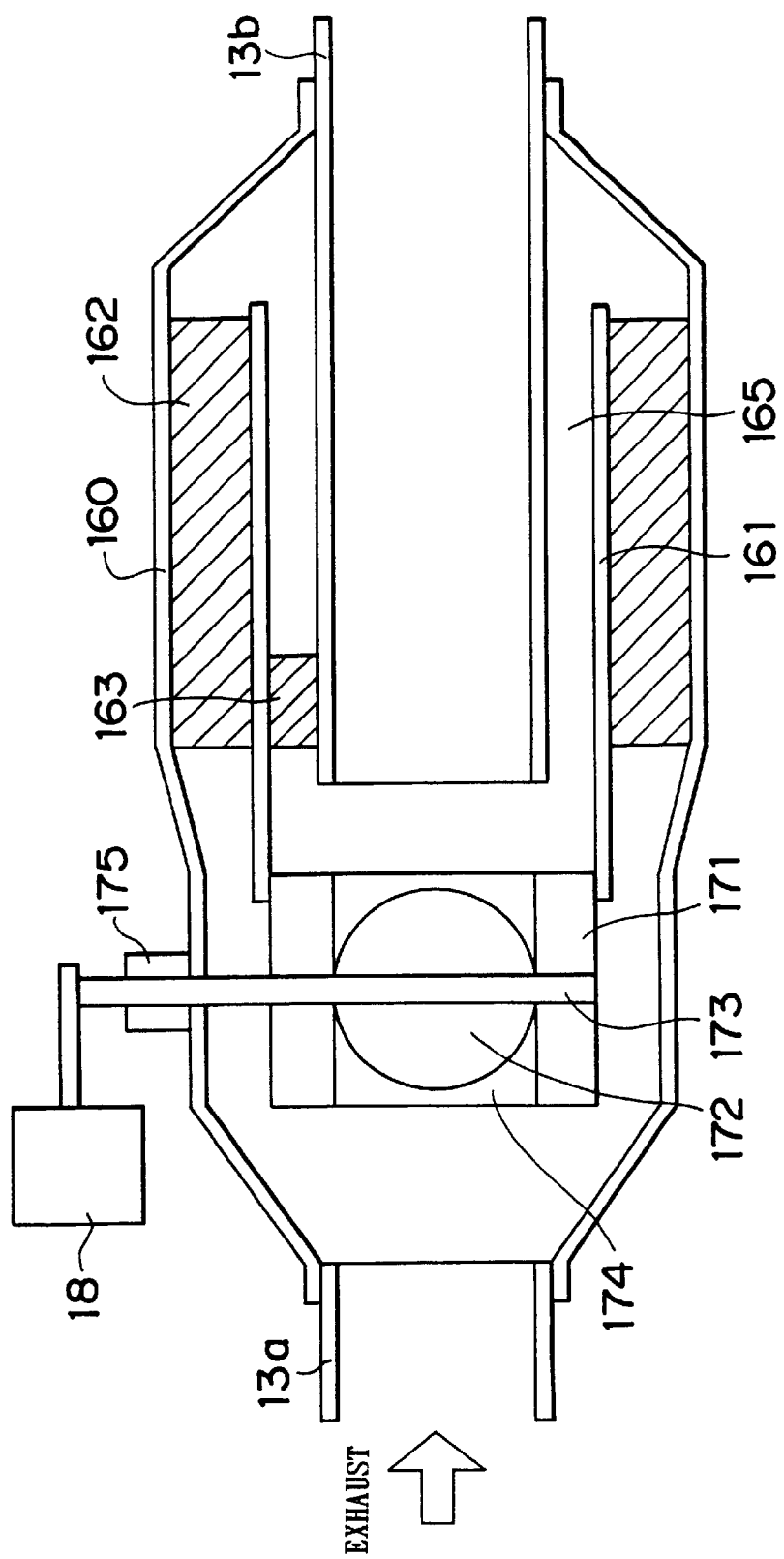
FIG. 7 is a sectional view illustrating the construction of a valve device.

The valve device 170 is provided at the upstream-side open end of the inner tube 161. The valve device 170 opens and closes the open end of the inner tube 161. The valve device 170 is formed by a butterfly-type two-way valve as shown in FIG. 7. More specifically, the valve device 170 has a housing 171 that is fitted into the upstream-side open end portion of the inner tube 161, a passage 174 extending through the housing 171 in the directions of an axis thereof, a valve body 172 that opens and closes the passage 174, and a shaft 173 connected to the valve body 172.

The shaft 173 is rotatably supported at one end thereof by the housing 171, and is rotatably supported at the second end by a bearing 175 that is provided on the outer wall surface of the outer tube 160. The second end of the shaft 173 is connected to the actuator 18 via a link mechanism and the like.

In the emission control apparatus constructed as described above, the valve body 172 assumes a completely closed state when the three-way catalyst device 14 is not activated. In this situation, exhaust gas from the upstream exhaust pipe 13a is led into an annular space 164 formed between the inner tube 161 and the outer tube 160, and then flows into the adsorbent 162. After flowing out of the adsorbent 162, exhaust gas strikes an inner wall surface of the outer tube 160, and therefore changes its flowing direction. Exhaust gas is then led into an annular space 165 formed between the inner tube 161 and the downstream exhaust pipe 13b. After passing through the space 165, exhaust gas strikes the valve device 170 and changes its flowing direction (as indicated at 166) to flow into the downstream exhaust pipe 13b.

After the three-way catalyst device 14 is activated, the valve body 172 assumes a fully open state. In this situation, an exhaust passage (main exhaust passage) extending from the upstream exhaust pipe 13a to the downstream exhaust pipe 13b via the passage 174 of the valve device 170 disposed within the outer tube 160 becomes conductive, and the exhaust passage (bypass passage) extending from the upstream exhaust pipe 13a to the downstream exhaust pipe 13b via the space 164 and the space 165 becomes conductive.

An exhaust gas inlet portion of the space 164 and an exhaust gas outlet portion of the space 165 are located adjacent to each other across the valve device 170. Therefore, the difference between the exhaust gas pressure near the exhaust gas inlet portion of the space 164 and the exhaust gas pressure near the exhaust gas outlet portion of the space 165 becomes small, and the phase difference between the pulsating flow of exhaust gas near the exhaust gas inlet portion of the space 164 and the pulsating flow of exhaust gas near the exhaust gas outlet portion of the space 165 also becomes small.

In the emission control apparatus of this embodiment, the inside diameter (D1) of the upstream exhaust pipe 13a, the diameter (D2) of the passage 174 through the housing 171, and the inside diameter (D3) of the downstream exhaust pipe 13b are set so as to satisfy $D1 \leq D2 \leq D3$ and, preferably, $D1 < D2 \leq D3$. The relationship $D1 < D2$ is preferable for the following reason. Even if the valve body 172 is fully open, the cross-section of the passage 174 has a reduced area due to the thickness of the valve body 172 and the diameter of the shaft 173. The pressure loss thereby caused can be practically eliminated if the relationship $D1 < D2$ is established. The reason for the relationship $D2 \leq D3$ is that if $D2 > D3$, the pressure in a space between the valve device 170 and the downstream exhaust pipe 13b within the inner tube 161 will increase so that the flow through the bypass passage 164, 165 may reverse.

An object of the invention is to slow down the desorption of unburned gas components by reducing the flow of exhaust gas passing through the adsorbent. Even if the flow through the bypass passage 164, 165 reverses, the object of the invention can be achieved provided that the flow is sufficiently small. Therefore, it is also possible to allow a reverse flow through the bypass passage 164, 165 as long as the flow therethrough is a desired flow. That is, a requirement is merely that the pressure difference between the exhaust gas inlet portion and the exhaust gas outlet portion of the bypass passage 164, 165 be small so that the flow through the bypass passage may be sufficiently small.

If the valve device 170 and the upstream exhaust pipe 13a are disposed apart from each other in the emission control apparatus described above, the distance (L1) between the valve device 170 and the upstream exhaust pipe 13a may be set so as to satisfy $(D2-D1)*0.5 \leq L1$ and, preferably, $D2-D1 \leq L1$. This option is based on a finding of the inventors that an undesired event occurs in which, depending on the velocity of flow of gas out of the upstream exhaust pipe 13a, a negative pressure occurs in an outlet portion of the upstream exhaust pipe 13a so that the pressure in the space 164 also becomes negative and causes a reverse flow of gas through the bypass passage 164, 165 can be prevented by arranging the valve device 170 and the upstream exhaust pipe 13a in such a manner as to satisfy the experimentally determined relationship mentioned above because that manner of arrangement substantially prevents the negative pressure in the outlet portion of the upstream exhaust pipe 13a from affecting the pressure in the space 164 and therefore prevents a reverse flow of gas through the bypass passage 164, 165.

As a result, a major portion of exhaust gas from the upstream exhaust pipe 13a flows through the exhaust passage extending from the upstream exhaust pipe 13a to the downstream exhaust pipe 13b via the passage 174, and the small remainder portion of exhaust gas flows through the exhaust passage extending from the upstream exhaust pipe 13a to the downstream exhaust pipe 13b via the space 164 and the space 165.

Therefore, the emission control apparatus of this embodiment achieves substantially the same advantages as achieved by the first embodiment and, furthermore, allows a size reduction of the entire emission control apparatus and thereby considerably facilitates installation of the apparatus into a vehicle.

Furthermore, this embodiment adopts an arrangement in which the adsorbent and the bypass passage are disposed coaxially with the main exhaust passage. Since the adsorbent and the main exhaust passage are separated from each other by a space that forms the bypass passage, the space serves as a heat-insulating portion to reduce heat conduction from the main exhaust passage to the adsorbent. As a result, the temperature increase of the adsorbent is gradual, so that the desorption of unburned gas components slows down.

Still further, the embodiment employs the butterfly-type two-way valve as a passage switching device according to the invention. The valve body of the butterfly-type two-way valve receives, from exhaust gas, a force that expedites the turning of the valve body on one of the halves of the valve body divided by the rotating axis thereof, and a force that opposes the turning of the valve body on the other half. However, the two forces balance each other. Therefore, the actuator can drive the valve body without being affected by exhaust gas, so that the load on the actuator is reduced. As a result, a size reduction of the actuator is allowed, so that the installation of the valve device, including the actuator, can be further facilitated.

However, the passage switching device is not limited to the butterfly-type two-way valve. For example, a slide valve may instead be used in order to reduce the resistance caused by exhaust gas when the valve is fully opened.

Figure 8:
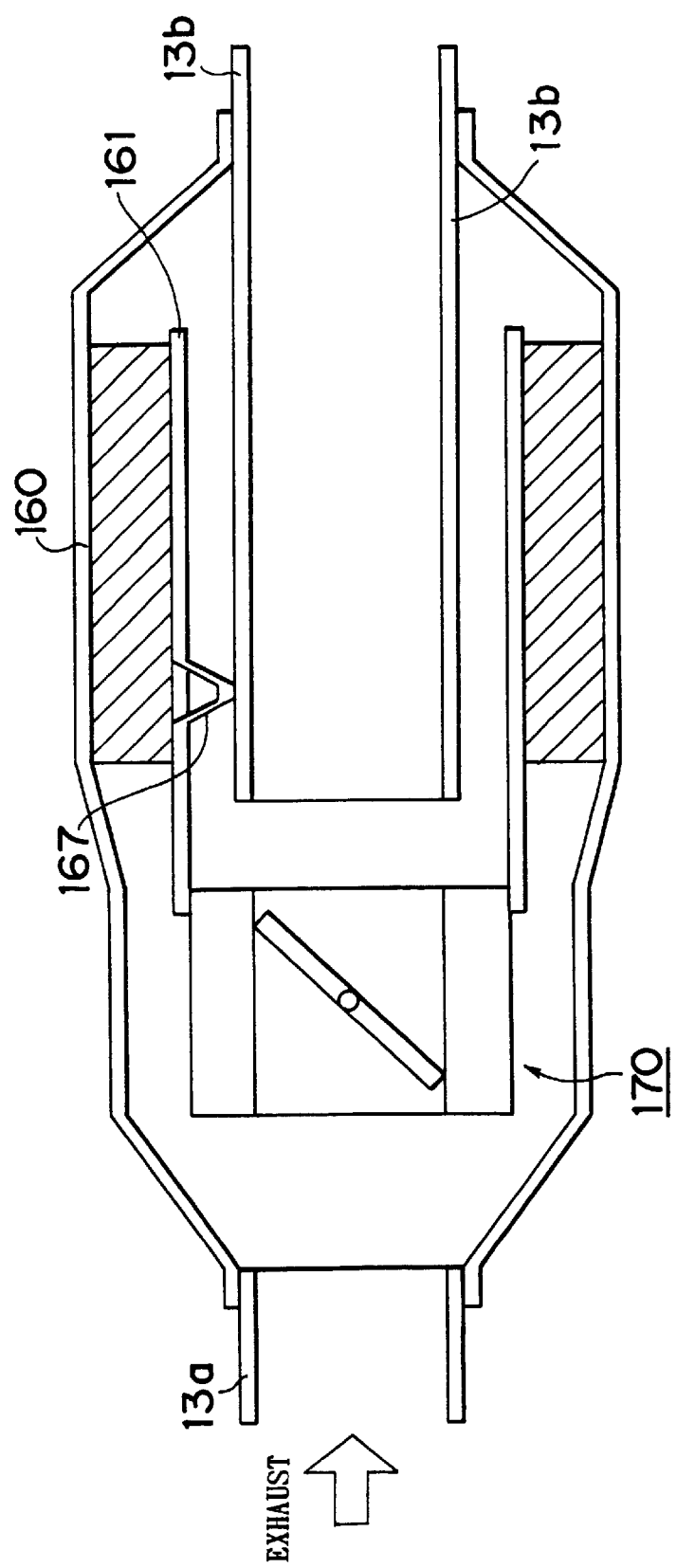
FIG. 8 illustrates another form of the retainers.
Figure 9:
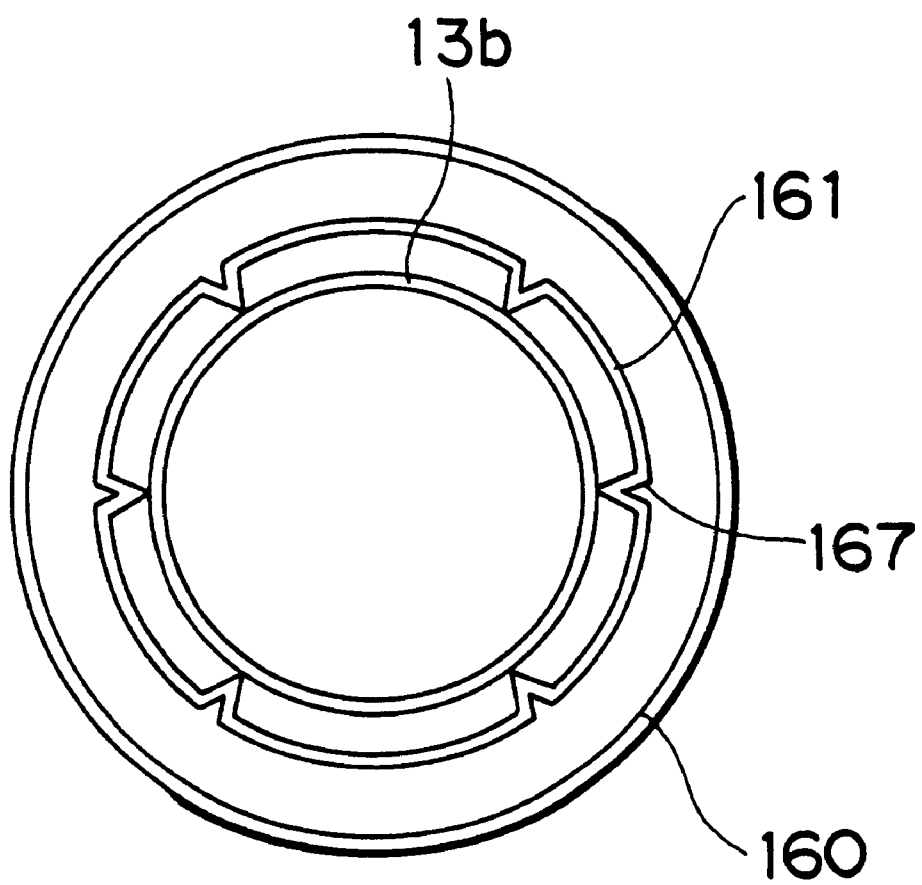
FIG. 9 is a view of the emission control apparatus shown in FIG. 8, taken in a direction of an axis of the apparatus.

Although in the second embodiment, dedicated retainers 163 are disposed at plural positions in the space formed between the inner tube 161 and the downstream exhaust pipe 13b in order to enhance the vibration resistance of the downstream exhaust pipe 13b, it is also possible to emboss semi-spherical protrusions 167 at plural positions in a member forming the inner tube 161 as shown in FIGS. 8 and 9 so that the protrusions 167 serve as retainers. It is preferred that the shape, number and position of such retainers be determined so as to achieve a desired flow through the bypass passage.

A third embodiment of the internal combustion engine emission control apparatus of the invention will be described with reference to FIG. 10. Features distinguishing the third embodiment from the second embodiment will mainly be described, and portions and arrangements comparable to those of the second embodiment will not be described again.

Figure 10:
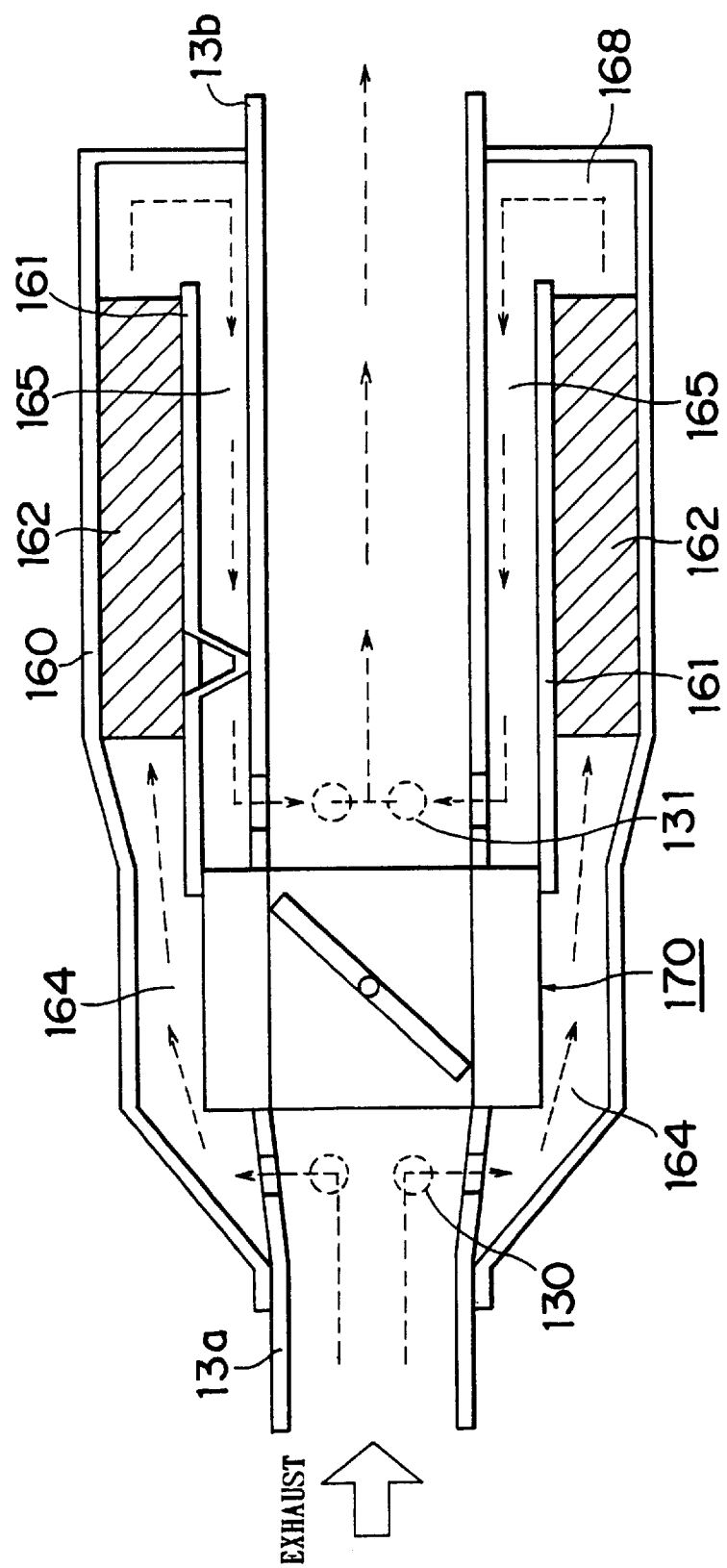
FIG. 10 illustrates a third embodiment of the emission control apparatus of the invention.

FIG. 10 illustrates an emission control apparatus according to the third embodiment of the invention. In the emission control apparatus shown in FIG. 10, an upstream exhaust pipe 13a and a downstream exhaust pipe 13b are interconnected by a valve device 170 within an outer tube 160. A portion of the upstream exhaust pipe 13a adjacent to a downstream-side end of the upstream exhaust pipe 13a has exhaust gas inlets 130 for communication between the inside of the upstream exhaust pipe 13a and the outside thereof (i.e., a space 164 defined between the upstream exhaust pipe 13a and the outer tube 160). The exhaust gas inlets 130 are arranged at predetermined intervals in a circumferential direction. A portion of the downstream exhaust pipe 13b adjacent to an upstream-side end of the downstream exhaust pipe 13b has exhaust gas outlets 131 for communication between the inside of the downstream exhaust pipe 13b and the outside thereof (i.e., a space 165 defined between the downstream exhaust pipe 13b and an inner tube 161). The exhaust gas outlets 131 are arranged at predetermined intervals in a circumferential direction.

The clearance between a downstream-side end portion of the inner tube 161 and a downstream-side end portion of the outer tube 160 is enlarged to form a space 168. The thus-formed space 168 serves as a damper chamber to damp the exhaust pulsation phase difference that occurs between an exhaust gas inlet portion (the exhaust gas inlets 130) and an exhaust gas outlet portion (the exhaust gas outlets 131) of a bypass passage 164, 165.

In the emission control apparatus constructed as described above, the damper chamber damps the exhaust pulsation phase difference between the exhaust gas inlets 130 and the exhaust gas outlets 131 even if the phase difference instantly increases, as occurs when the flow of exhaust gas from the internal combustion engine 1 sharply changes. Therefore, the embodiment prevents an undesired event from occurring in which the difference between the exhaust gas pressure near the exhaust gas inlets 130 and the exhaust gas pressure near the exhaust gas outlets 131 significantly increases, and ensures that the flow of exhaust gas through the adsorbent 162 will always be small.

Furthermore, with the construction described above, the pressure difference between the exhaust gas inlets 130 and the exhaust gas outlets 131 can easily be set to a desired magnitude by adjusting the shape, number or diameter of the exhaust gas inlets 130 and the exhaust gas outlets 131 in a production process of the emission control apparatus.

A fourth embodiment of the internal combustion engine emission control apparatus of the invention will be described with reference to FIG. 11. Features distinguishing the fourth embodiment from the second embodiment will mainly be described, and portions and arrangements comparable to those of the second embodiment will not be described again.

Figure 11:
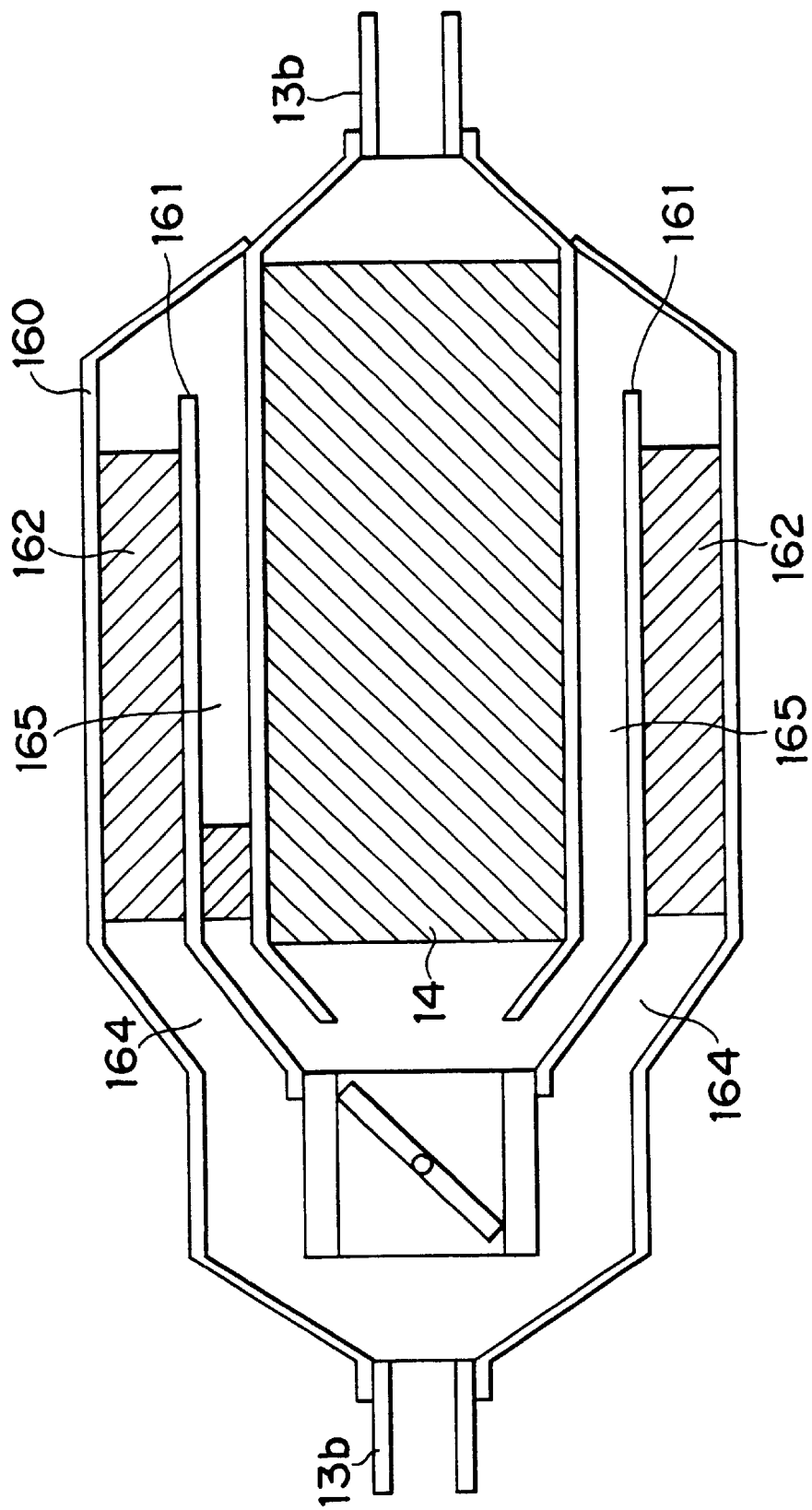
FIG. 11 illustrates a fourth embodiment of the emission control apparatus of the invention.

FIG. 11 illustrates an emission control apparatus according to the fourth embodiment of the invention in which an exhaust gas-purifying catalyst device and an adsorbent are coaxially arranged. In the emission control apparatus shown in FIG. 11, a portion of a downstream exhaust pipe 13b extending into an outer tube 160 has an increased inside diameter. This expanded portion of the downstream exhaust pipe 13b contains a three-way catalyst device 14. The three-way catalyst device 14 in this construction is disposed upstream of the position of the three-way catalyst device in the first to third embodiments. Therefore, the three-way catalyst device 14 in the fourth embodiment is exposed to higher-temperature exhaust gas than the three-way catalyst device in any of the first to third embodiments, so that the three-way catalyst device 14 can be activated more quickly.

Furthermore, the three-way catalyst device 14 is surrounded by a space 165 (bypass passage) in the fourth embodiment. Therefore, the space 165 serves as a heat insulating portion to block heat radiation from the three-way catalyst device 14. As a result, the thermal insulation of the three-way catalyst device 14 improves, and the overheat deterioration of an adsorbent 162 disposed in a space 164 between the outer tube 160 and an inner tube 161 is prevented.

Still further, since the three-way catalyst device 14 is disposed coaxially with the bypass passage 164, 165 and the adsorbent 162, these components and the like can be closely packed. As a result, a size reduction of the emission control apparatus is allowed, so that the installation of the apparatus into a vehicle is further facilitated.

Figure 12:
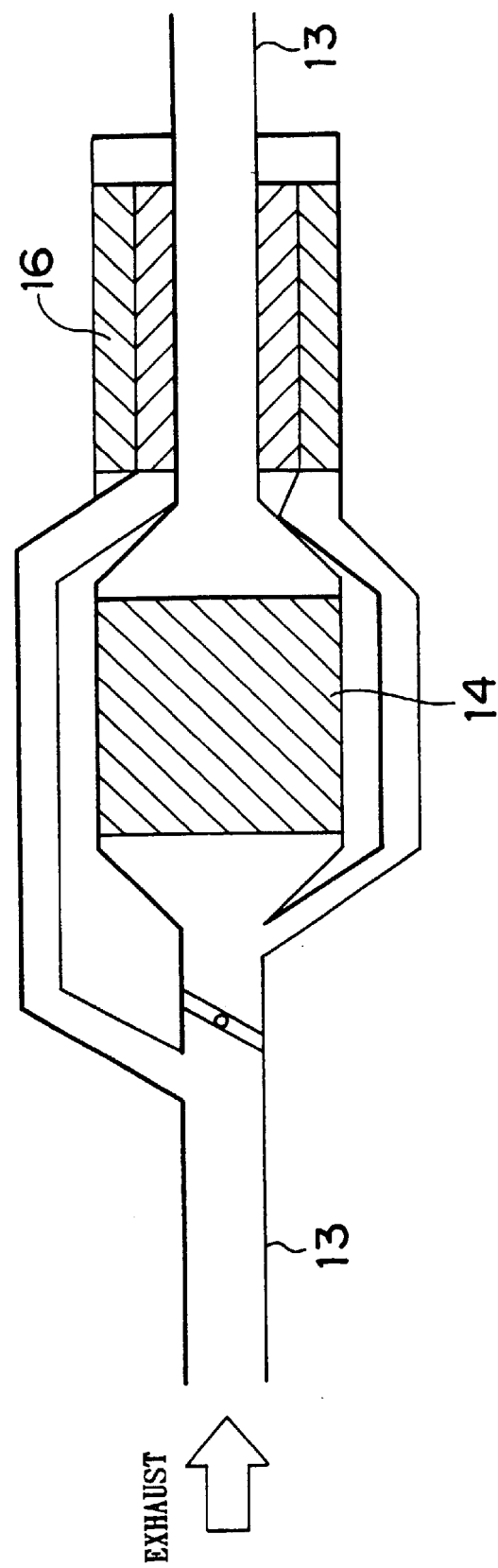
FIG. 12 illustrates another arrangement of the emission control apparatus in which an adsorbent is disposed downstream of a three-way catalyst device.

If there is a need to reduce the outside diameter of the emission control apparatus for installation into a vehicle, the adsorbent 162 may be disposed around a portion of the exhaust pipe 13 extending downstream of the three-way catalyst device 14 as shown in FIG. 12. This construction makes it possible to activate the three-way catalyst device 14 in an earlier period. Furthermore, in the construction shown in FIG. 12, the length of the bypass passage is increased, so that the temperature of exhaust gas flowing into the adsorbent 16 becomes lower. Therefore, the temperature increasing rate of the adsorbent 16 is further reduced, so that the desorption of unburned gas components correspondingly slows down.

A fifth embodiment of the internal combustion engine emission control apparatus of the invention will be described with reference to FIGS. 13 and 14. Features distinguishing the fifth embodiment from the second embodiment will mainly be described, and portions and arrangements comparable to those of the second embodiment will not be described again.

Figure 13:
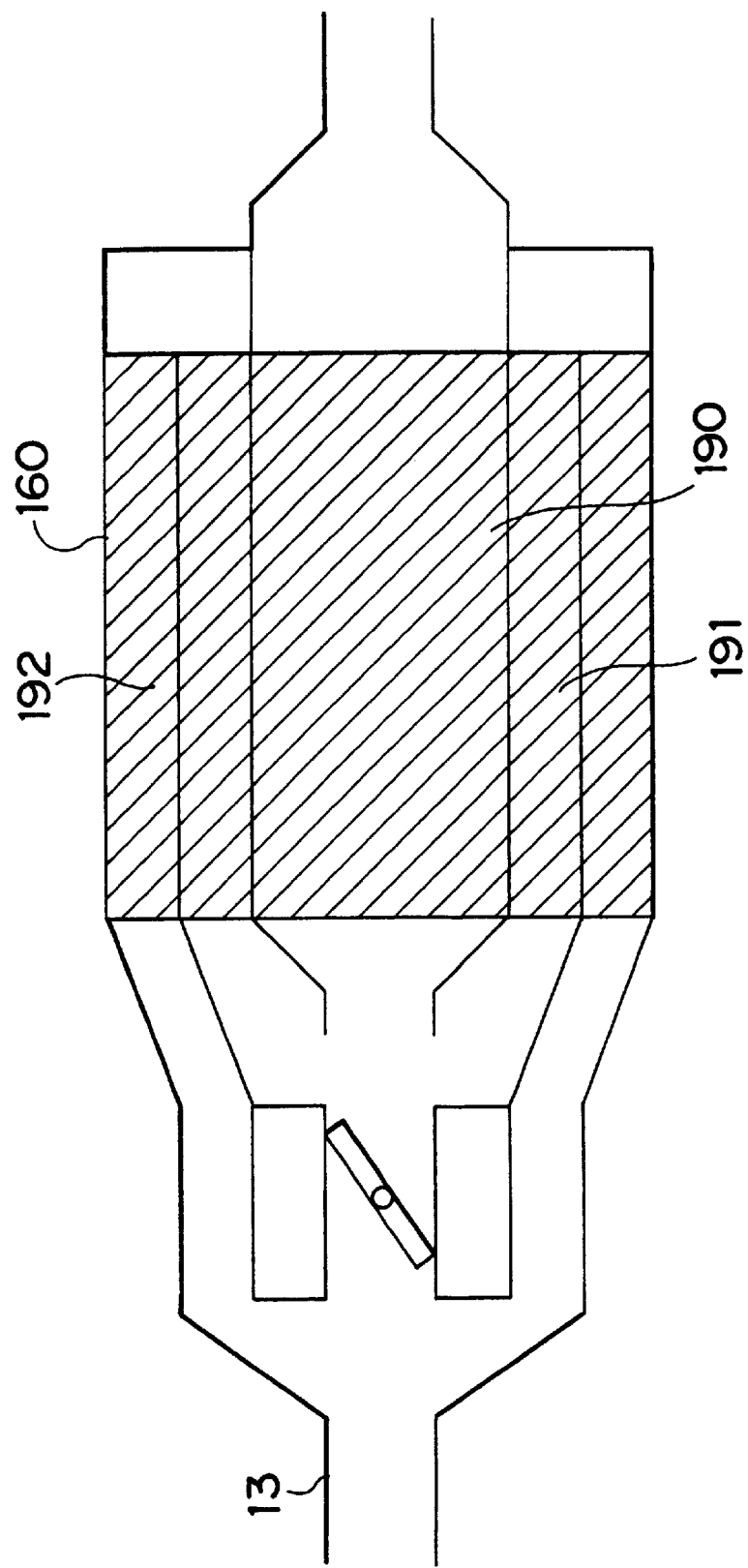
FIG. 13 illustrates a fifth embodiment of the emission control apparatus of the invention.
Figure 14:
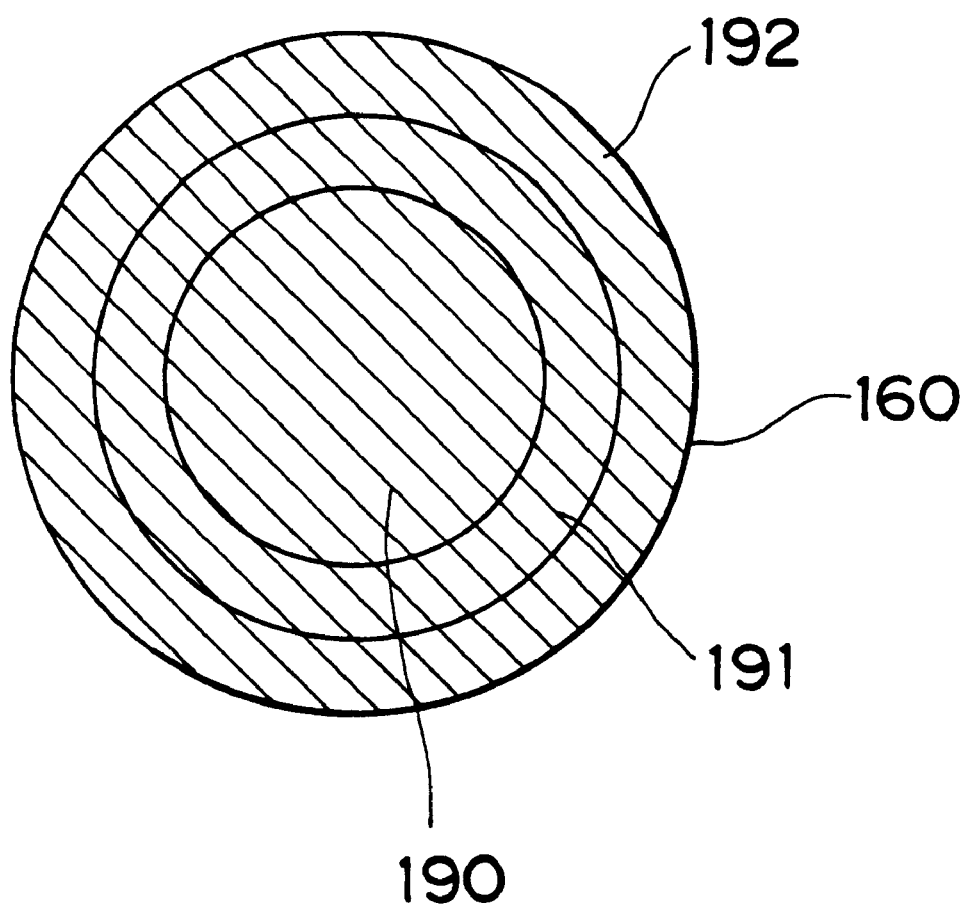
FIG. 14 is a view of the emission control apparatus shown in FIG. 13, taken in a direction of an axis of the apparatus.

FIGS. 13 and 14 illustrate an emission control apparatus according to the fifth embodiment of the invention. In the emission control apparatus of this embodiment, an outer tube 160 contains a honeycomb body in which a plurality of exhaust passages are joined. The honeycomb body is divided into three coaxial divisions 190, 191, 192. Of the three honeycomb divisions 190, 191, 192, a central honeycomb division 190 is loaded with catalysts, and an outermost honeycomb division 192 is coated with an adsorbent. An intermediate honeycomb division 191 may be coated with an adsorbent or may be left uncoated.

Since such a honeycomb body is used, the emission control apparatus can be constructed without requiring an inner tube. Therefore, size and weight reductions of the apparatus can be achieved.

The method for producing the above-described emission control apparatus may be, for example, a method in which the outermost honeycomb division 192 is coated with an adsorbent while the inlet and outlet openings of the passages through the central and intermediate honeycomb divisions 190, 191 are closed, and the central honeycomb division 190 is coated with catalysts while the inlet and outlet openings of the passages through the intermediate and outermost honeycomb divisions 191, 192 are closed. Alternatively, the apparatus can be produced by a method in which the central and outermost honeycomb divisions 190, 192 are subjected to multi-layer coating with catalysts and an adsorbent (respectively) while only the passages through the intermediate honeycomb division 191 are closed. As another option, the apparatus can be produced by a method in which the central and outermost honeycomb divisions 190, 192 are coated with catalysts while the passages through the intermediate honeycomb division 191 are closed, and then only the outermost honeycomb division 192 is coated with an adsorbent while the passages through the central and intermediate honeycomb divisions 190, 191 are closed, and the like.

Therefore, this embodiment can provide a small-size and light-weight emission control apparatus that is easy to produce.

In the foregoing embodiments, the flow through the bypass passage, that is, the flow of exhaust gas passing through the adsorbent, is controlled to become equal to or less than a predetermined amount. Therefore, the temperature increasing rate of the adsorbent is reduced, so that the desorption of unburned gas components from the adsorbent slows down.

As a result, the embodiments prevent an undesired event from occurring in which the unburned gas components adsorbed to the adsorbent are desorbed from the adsorbent and flow into the exhaust gas-purifying catalyst device in large amounts at one time (i.e., in unison). Hence, the air-fuel ratio of exhaust gas flowing into the exhaust gas-purifying catalyst device is substantially prevented from becoming a rich air-fuel ratio in which the oxygen storing capacity of the exhaust gas-purifying catalyst device is exceeded or a rich air-fuel ratio that exceeds the detection range of the air-fuel ratio sensor, so that the exhaust air-fuel ratio will not deviate from the range of air-fuel ratio in which the catalyst device is able to purify exhaust gas.

The flow through the bypass passage, that is, the flow of exhaust gas passing through the adsorbent, is controlled so that the flow assumes a substantially constant proportion to the flow through the main exhaust passage, the substantially constant proportion being equal to or less than a predetermined value. Therefore, even if the flow of exhaust gas from the internal combustion engine changes, the change in the air-fuel ratio of exhaust gas flowing into the exhaust gas-purifying catalyst device is substantially prevented.

Therefore, when applied to an internal combustion engine which employs an adsorbent that adsorbs unburned gas components present in exhaust gas, the foregoing embodiments are able to prevent an undesired event from occurring in which unburned gas components adsorbed to the adsorbent are desorbed therefrom and flow into the exhaust gas-purifying catalyst device in unison. Therefore, the air-fuel ratio of exhaust gas flowing into the exhaust gas-purifying catalyst device can be stabilized, so that the exhaust gas-purifying catalyst device can reliably achieve significant reductions of the amounts of harmful gas components and unburned gas components present in exhaust gas. As a result, deterioration of emissions caused by unburned gas components desorbed from the adsorbent can be prevented.

If the invention is applied to an internal combustion engine in which feedback control is performed so as to achieve a target air-fuel ratio of exhaust gas flowing into the exhaust gas-purifying catalyst device, desorption of unburned gas components from the adsorbent does not considerably disturb the air-fuel ratio of exhaust gas flowing into the exhaust gas-purifying catalyst device. Therefore, it becomes possible to always maintain an optimal air-fuel ratio of exhaust gas flowing into the exhaust gas-purifying catalyst device, so that the emission quality improves.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. An emission control apparatus for an internal combustion engine, comprising:

a catalyst device provided in a main exhaust passage for lessening a harmful gas component of exhaust gas;

a bypass passage bypassing a portion of the main exhaust passage that is located upstream of the catalyst device;

an adsorbent provided in the bypass passage and that adsorbs an unburned gas component of exhaust gas when the adsorbent has a temperature below a predetermined temperature, and releases the unburned gas component when the adsorbent has a temperature equal to or higher than the predetermined temperature; and a passage switching valve that switches between a first state that causes flow of exhaust gas to the main exhaust passage and a second state that causes flow of exhaust gas to the bypass passage;

wherein a flow that occurs through the bypass passage when the passage switching valve is in the first state and the unburned gas component is released from the adsorbent is maintained at an amount that is sufficiently small so that the adsorbent relaease the unburned gas component at a rate that is too small to significantly affect operation of the catalyst device, and wherein the bypass passage includes a first portion in which the exhaust gas flows in a downstream direction with respect to a direction in which the exhaust gas flows through the main exhaust passage, and a second portion in which the exhaust gas flows in an upstream direction with respect to the direction in which the exhaust gas flows through the main exhaust passage, wherein the exhaust gas flows through the first portion prior to flowing through the second portion.

2. An emission control apparatus according to claim 1, wherein a damper chamber that damps exhaust pulsation is formed in the bypass passage.

3. An emission control apparatus according to claim 1, wherein each of an exhaust gas inlet portion of the bypass passage and an exhaust gas outlet portion of the bypass passage has a shape such that a differential pressure occurring between the exhaust gas inlet portion and the exhaust gas outlet portion becomes equal to or less than a predetermined pressure.

4. An emission control apparatus according to claim 1, further comprising:

an air-fuel ratio sensor that detects at least an air-fuel ratio of exhaust gas downstream of the adsorbent; and a controller that adjusts the air-fuel ratio of exhaust gas so that a value of an output signal of the air-fuel ratio sensor becomes equal to a target air-fuel ratio.

5. An emission control apparatus according to claim 1, wherein a detector detects at least one of an amount of unburned gas component present in exhaust gas and an air-fuel ratio of exhaust gas downstream of the adsorbent, and a controller controls the passage switching valve so that the at least one of the amount of the unburned gas component and the air-fuel ratio of exhaust gas becomes constant.

6. An emission control apparatus according to claim 1, wherein a ratio between the flow through the bypass passage and a flow through the main exhaust passage when the passage switching valve is in the first state is no more than 10%.

7. An emission control apparatus according to claim 1, wherein a ratio between the flow through the bypass passage and a flow through the main exhaust passage when the passage switching valve is in the first state is no more than 1%.

8. An emission control apparatus according to claim 1, wherein the adsorbent is located at least in the first portion.

9. An emission control apparatus according to claim 1, wherein the flow that occurs through the bypass passage when the passage switching valve is in the first state is equal to or less than a predetermined flow.

10. An emission control apparatus according to claim 9, wherein the flow that occurs through the bypass passage when the passage switching valve is in the first state is equal to or less than the predetermined flow and is equal to or less than the predetermined proportion relative to the flow through the main exhaust passage, regardless of an operating condition of the internal combustion engine.

11. An emission control apparatus according to claim 1, wherein the bypass passage is arranged at such a position that a differential pressure occurring between an exhaust gas inlet portion of the bypass passage and an exhaust gas outlet portion of the bypass passage becomes equal to or less than a predetermined pressure.

12. An emission control apparatus according to claim 11, wherein the exhaust gas inlet portion of the bypass passage is disposed at a position in the main exhaust passage adjacent to and upstream of the passage switching valve, and the exhaust gas outlet portion of the bypass passage is disposed at a position in the main exhaust passage adjacent to and downstream of the passage switching valve.

13. An emission control apparatus according to claim 11, wherein the predetermined pressure is no more than 2 kPa.

14. An emission control apparatus according to claim 11, wherein the predetermined pressure is no more than 1 kPa.

15. An emission control apparatus according to claim 1, wherein the adsorbent and the bypass passage are arranged coaxially with the main exhaust passage.

16. An emission control apparatus according to claim 15, wherein the adsorbent and the bypass passage are arranged coaxially with the catalyst device disposed in the main exhaust passage.

17. An emission control apparatus according to claim 1, wherein a detector detects a pressure difference between an exhaust gas inlet portion of the bypass passage and an exhaust gas outlet portion of the bypass passage, and a controller controls the passage switching valve so that the detected pressure difference becomes a predetermined value.

18. An emission control apparatus according to claim 17, wherein the detector includes a first pressure sensor provided at the exhaust gas inlet portion of the bypass passage to sense a pressure at the exhaust gas inlet portion, and a second pressure sensor provided at the exhaust gas outlet portion of the bypass passage to sense a pressure at the exhaust gas outlet portion.

19. An emission control apparatus according to claim 1, wherein the first portion and the second portion are layered in a radial direction of the main exhaust passage.

20. An emission control apparatus according to claim 19, wherein the first portion is located radially farther away from the main exhaust passage than the second portion.

21. An emission control apparatus according to claim 20, wherein the adsorbent is located at least in the first portion.

22. An emission control apparatus for an internal combustion engine, comprising:

a catalyst device provided in a main exhaust passage for lessening a harmful gas component of exhaust gas;

a bypass passage bypassing a portion of the main exhaust passage that is located upstream of the catalyst device;

an adsorbent provided in the bypass passage and that adsorbs an unburned gas component of exhaust gas when the adsorbent has a temperature below a predetermined temperature, and releases the unburned gas component when the adsorbent has a temperature equal to or higher than the predetermined temperature;

a passage switching valve that switches between a first state that allows flow of exhaust gas through the main exhaust passage and through the bypass passage, and a second state that prevents flow of exhaust gas through the main exhaust passage while allowing flow of exhaust gas through the bypass passage; and means for controlling a bypass flow that occurs through the bypass passage when the passage switching valve is in the first state and the unburned gas component is released from the adsorbent such that an amount of the bypass flow is sufficiently small so that the adsorbent releases the unburned gas component at a rate that is too small to significantly affect operation of the catalyst device, wherein the bypass passage includes a first portion in which the exhaust gas flows in a downstream direction with respect to a direction in which the exhaust gas flows through the main exhaust passage, and a second portion in which the exhaust gas flows in an upstream direction with respect to the direction in which the exhaust gas flows through the main exhaust passage, wherein the exhaust gas flows through the first portion prior to flowing through the second portion.

23. An emission control apparatus according to claim 22, wherein the adsorbent is located at least in the first portion.

24. An emission control apparatus according to claim 22, wherein the first portion and the second portion are layered in a radial direction of the main exhaust passage.

25. An emission control apparatus according to claim 24, wherein the first portion is located radially farther away from the main exhaust passage than the second portion.

26. An emission control apparatus according to claim 25, wherein the adsorbent is located at least in the first portion.

27. An emission control apparatus for an internal combustion engine, comprising:
  a catalyst device provided in a main exhaust passage for lessening a harmful gas component of exhaust gas;
  a bypass passage bypassing a portion of the main exhaust passage that is located upstream of the catalyst device;
  an adsorbent provided in the bypass passage and that adsorbs an unburned gas component of exhaust gas when the adsorbent has a temperature below a predetermined temperature, and releases the unburned gas component when the adsorbent has a temperature equal to or higher than the predetermined temperature; and
  a passage switching valve that switches between a first state that causes flow of exhaust gas to the main exhaust passage and a second state that causes flow of exhaust gas to the bypass passage;
  wherein a flow of exhaust gas that occurs through the bypass passage when the passage switching valve is in the first state and the unburned gas component is released from the adsorbent is maintained at an amount that is equal to or less than a predetermined amount, and
  wherein the bypass passage includes a first portion in which the exhaust gas flows in a downstream direction with respect to a direction in which the exhaust gas flows through the main exhaust passage, and a second portion in which the exhaust gas flows in an upstream direction with respect to the direction in which the exhaust gas flows through the main exhaust passage, wherein the exhaust gas flows through the first portion prior to flowing through the second portion.

28. An emission control apparatus according to claim 27, wherein the predetermined amount is a predetermined small amount.

29. An emission control apparatus according to claim 27, wherein the adsorbent is located at least in the first portion.

30. An emission control apparatus according to claim 27, wherein the first portion and the second portion are layered in a radial direction of the main exhaust passage.

31. An emission control apparatus according to claim 30, wherein the first portion is located radially farther away from the main exhaust passage than the second portion.

32. An emission control apparatus according to claim 31, wherein the adsorbent is located at least in the first portion.

33. An emission control apparatus for an internal combustion engine, comprising:
  a catalyst device provided in a main exhaust passage for lessening a harmful gas component of exhaust gas;
  a bypass passage bypassing a portion of the main exhaust passage that is located upstream of the catalyst device;
  an adsorbent provided in the bypass passage and that adsorbs an unburned gas component of exhaust gas when the adsorbent has a temperature below a predetermined temperature, and releases the unburned gas component when the adsorbent has a temperature equal to or higher than the predetermined temperature;
  a passage switching valve that switches between a first state that allows flow of exhaust gas through the main exhaust passage and through the bypass passage, and a second state that prevents flow of exhaust gas through the main exhaust passage while allowing flow of exhaust gas through the bypass passage; and
  means for controlling a bypass flow of exhaust gas that occurs through the bypass passage when the passage switching valve is in the first state and the unburned gas component is released from the adsorbent such that an amount of the bypass flow is equal to or less than a predetermined amount,
  wherein the bypass passage includes a first portion in which the exhaust gas flows in a downstream direction with respect to a direction in which the exhaust gas flows through the main exhaust passage, and a second portion in which the exhaust gas flows in an upstream direction with respect to the direction in which the exhaust gas flows through the main exhaust passage, wherein the exhaust gas flows through the first portion prior to flowing through the second portion.

34. An emission control apparatus according to claim 33, wherein the adsorbent is located at least in the first portion.

35. An emission control apparatus according to claim 33, wherein the first portion and the second portion are layered in a radial direction of the main exhaust passage.

36. An emission control apparatus according to claim 35, wherein the first portion is located radially farther away from the main exhaust passage than the second portion.

37. An emission control apparatus according to claim 36, wherein the adsorbent is located at least in the first portion.

38. An emission control apparatus for an internal combustion engine, comprising:
  a catalyst device provided in a main exhaust passage for lessening a harmful gas component of exhaust gas;
  a bypass passage bypassing a portion of the main exhaust passage that is located upstream of the catalyst device;
  an adsorbent provided in the bypass passage and that adsorbs an unburned gas component of exhaust gas when the adsorbent has a temperature below a predetermined temperature, and releases the unburned gas component when the adsorbent has a temperature equal to or higher than the predetermined temperature; and
  a passage switching valve that switches between a first state that causes flow of exhaust gas to the main exhaust passage and a second state that causes flow of exhaust gas to the bypass passage;
  wherein a flow that occurs through the bypass passage when the passage switching valve is in the first state and the unburned gas component is released from the adsorbent is maintained at an amount that is sufficiently small so that the adsorbent releases the unburned gas component at a rate that is too small to significantly affect operation of the catalyst device,
  wherein the adsorbent and the bypass passage are arranged coaxially with the catalyst device disposed in the main exhaust passage, and
  wherein the bypass passage is provided with at least one retainer that prevents the bypass passage from deforming, and the flow that occurs through the bypass passage when the passage switching valve is in the first state is adjusted by adjusting one of a shape, a number and a position of the at least one retainer.

* * * * *